(12) United States Patent
Hu et al.

(10) Patent No.: US 10,552,004 B2
(45) Date of Patent: Feb. 4, 2020

(54) METHOD FOR PROVIDING APPLICATION, AND ELECTRONIC DEVICE THEREFOR

(71) Applicant: Samsung Electronics Co., Ltd., Gyeonggi-do (KR)

(72) Inventors: Ping Hu, Beijing (CN); Gengyu Ma, Beijing (CN); Jae-hyun Kim, Seoul (KR); Young-su Moon, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/758,035

(22) PCT Filed: Sep. 7, 2016

(86) PCT No.: PCT/KR2016/010015
§ 371 (c)(1),
(2) Date: Mar. 7, 2018

(87) PCT Pub. No.: WO2017/043857
PCT Pub. Date: Mar. 16, 2017

(65) Prior Publication Data
US 2018/0253196 A1  Sep. 6, 2018

(30) Foreign Application Priority Data

Sep. 7, 2015  (CN) .......................... 2015 1 0564774

(51) Int. Cl.
*G06F 3/048* (2013.01)
*G06K 9/00* (2006.01)
(Continued)

(52) U.S. Cl.
CPC ............ *G06F 3/0482* (2013.01); *G06F 3/011* (2013.01); *G06F 3/0488* (2013.01);
(Continued)

(58) Field of Classification Search
CPC ... G06F 2203/011; G06F 3/0481; G06F 9/451
See application file for complete search history.

(56) References Cited

U.S. PATENT DOCUMENTS 5,280,275 A * 1/1994 Kaplan ............... G06F 3/04847
345/157
8,626,141 B2  1/2014  Davies-Moore et al.
(Continued)

FOREIGN PATENT DOCUMENTS

KR  1020120047990  5/2012
KR  1020130084543  7/2013
(Continued)

OTHER PUBLICATIONS

European Search Report dated Jun. 6, 2018 issued in counterpart application No. 16844675.5-1216, 10 pages.
(Continued)

*Primary Examiner* — Scott T Baderman
*Assistant Examiner* — Mario M Velez-Lopez
(74) *Attorney, Agent, or Firm* — The Farrell Law Firm, P.C.

(57) ABSTRACT

Provided is an application providing method of an electronic device, the application providing method including: obtaining manipulation information of a user with respect to an application provided by the electronic device; obtaining feeling information of the user; modifying a user interface of the application based on the manipulation information and the feeling information of the user; and providing the application including the modified user interface.

12 Claims, 18 Drawing Sheets

(51) Int. Cl.
  *G06F 3/0482* (2013.01)
  *G06F 3/0488* (2013.01)
  *G06F 3/01* (2006.01)

(52) U.S. Cl.
  CPC ..... *G06K 9/00268* (2013.01); *G06K 9/00302* (2013.01); *G06F 2203/011* (2013.01)

(56) References Cited

U.S. PATENT DOCUMENTS

| | | | |
|---|---|---|---|
| 8,782,536 | B2 | 7/2014 | Tu |
| 8,806,444 | B1 | 8/2014 | Podgomy et al. |
| 8,869,115 | B2 | 10/2014 | Bruns et al. |
| 10,169,827 | B1* | 1/2019 | Paulus ................ G06Q 40/123 |
| 10,275,583 | B2* | 4/2019 | Leuthardt ............... H04W 4/21 |
| 2007/0033634 | A1* | 2/2007 | Leurs ..................... H04N 7/163 |
| | | | 725/143 |
| 2009/0002178 | A1 | 1/2009 | Guday et al. |
| 2009/0150919 | A1* | 6/2009 | Lee ................... H04N 7/17309 |
| | | | 725/10 |
| 2011/0300847 | A1* | 12/2011 | Quy ........................ H04W 4/00 |
| | | | 455/419 |
| 2012/0004511 | A1 | 1/2012 | Sivadas |
| 2012/0011477 | A1 | 1/2012 | Sivadas |
| 2012/0015624 | A1 | 1/2012 | Scott et al. |
| 2012/0182309 | A1 | 7/2012 | Griffin et al. |
| 2013/0120429 | A1 | 5/2013 | Sukup |
| 2013/0120520 | A1 | 5/2013 | Eun et al. |
| 2013/0152000 | A1* | 6/2013 | Liu ........................... G06F 9/44 |
| | | | 715/765 |
| 2013/0185648 | A1* | 7/2013 | Kim ....................... G06F 3/048 |
| | | | 715/744 |
| 2013/0316684 | A1 | 11/2013 | Cho |
| 2013/0339849 | A1* | 12/2013 | Mebed ................ G06Q 10/107 |
| | | | 715/273 |
| 2013/0346546 | A1 | 12/2013 | Jung |
| 2014/0192229 | A1 | 7/2014 | Kim et al. |
| 2014/0195619 | A1 | 7/2014 | Hodjat |
| 2016/0217321 | A1* | 7/2016 | Gottlieb ............. G06K 9/00308 |
| 2018/0136794 | A1* | 5/2018 | Cassidy ................ G06F 3/0482 |
| 2018/0176168 | A1* | 6/2018 | Tsou ....................... H04L 51/24 |

FOREIGN PATENT DOCUMENTS

| | | |
|---|---|---|
| KR | 1020150055926 | 5/2015 |
| WO | WO 2011/142898 | 11/2011 |
| WO | WO 2014/085910 | 6/2014 |

OTHER PUBLICATIONS

International Search Report dated Dec. 2, 2016 issued in counterpart application No. PCT/KR2016/010015, 20 pages.

\* cited by examiner

| REFERENCE | EMOTIONAL STATE |
|---|---|
| SWEATING AMOUNT > FIRST THRESHOLD VALUE | FEAR |
| SWEATING AMOUNT ≤ FIRST THRESHOLD VALUE | TRANQUILITY |
| MUSCLE CONTRACTION LEVEL > SECOND THRESHOLD VALUE | DISGUST |
| FINGER TREMOR LEVEL > THIRD THRESHOLD VALUE | ANGER |
| HEART RATE > FOURTH THRESHOLD VALUE | SURPRISE |
| PULSE RATE > FIFTH THRESHOLD VALUE | JOY |
| PULSE RATE ≤ SIXTH THRESHOLD VALUE | SADNESS |
| ... | |

METHOD FOR PROVIDING APPLICATION, AND ELECTRONIC DEVICE THEREFOR

PRIORITY

This application is a National Phase Entry of PCT International Application No. PCT/KR2016/010015, which was filed on Sep. 7, 2016, and claims priority to Chinese Patent Application No. 201510564774.1, which was filed on Sep. 7, 2015, the contents of each of which are incorporated herein by reference.

TECHNICAL FIELD

The present disclosure relates to an electronic device and a method of providing application based on manipulation information and feeling information of a user

BACKGROUND ART

With rapid development of the Internet, smart services provided by electronic devices have gradually become abundant. Most electronic devices provide various smart services to users through applications. In this regard, the users may show various feelings while using various applications. A feeling of a user who is manipulating an application may be determined and reflected in the application so as to improve user experience (UX) with respect to the application.

DETAILED DESCRIPTION OF THE INVENTION

Technical Solution

Provided are an electronic device and a method of providing application based on manipulation information and feeling information of a user.

In accordance with an aspect of the present disclosure, an application providing method of an electronic device, the application providing method includes: obtaining manipulation information of a user with respect to an application provided by the electronic device; obtaining feeling information of the user; modifying a user interface of the application based on the manipulation information and the feeling information of the user; and providing the application including the modified user interface.

The obtaining of the manipulation information may include obtaining at least one of a manipulation location, a manipulation force, and a manipulation frequency of the user manipulating the application.

The obtaining of the feeling information may include: identifying an expression of the user manipulating the application; and determining an emotional state of the user based on the expression of the user.

The identifying of the expression of the user may include: obtaining a face image of the user manipulating the application, through an image sensor; extracting feature points from the face image of the user; comparing the extracted feature points and feature points included in pre-defined expression information; and identifying the expression of the user based on a result of the comparing.

The obtaining of the feeling information may include: detecting at least one of sweating amount information, muscle contraction information, finger tremor information, heart rate information, and pulse information of the user manipulating the application; and determining an emotional state of the user based on the at least one detected information.

The modifying of the user interface of the application may include: determining priorities between functions provided by the application by analyzing the manipulation information and the feeling information of the user; and modifying the user interface based on the determined priorities between the functions.

The modifying of the user interface of the application may include: determining priorities between pieces of content displayed in the application, based on the manipulation information and the feeling information of the user; and changing an arrangement of the pieces of content based on the determined priorities between the pieces of content.

The modifying of the user interface of the application may include: obtaining information about an execution path of a first function; determining a preference of the user with respect to the execution path of the first function; and selectively changing a structure related to the execution path of the first function, based on the determined preference of the user.

The application providing method may further include recommending another application to the user based on the manipulation information and the feeling information of the user.

The modifying of the user interface of the application may include: obtaining manipulation information and feeling information of another user with respect to the application, from an external device; and modifying the user interface of the application while considering the manipulation information and the feeling information of the other user.

In accordance with another aspect of the present disclosure, an electronic device includes: a controller configured to obtain manipulation information of a user with respect to an application, obtain feeling information of the user, and modify a user interface of the application based on the manipulation information and the feeling information of the user; and a display configured to provide the application including the modified user interface.

The controller may be further configured to obtain at least one of a manipulation location, a manipulation force, and a manipulation frequency of the user manipulating the application.

The controller may be further configured to identify an expression of the user manipulating the application, and determine an emotional state of the user based on the expression of the user.

The controller may be further configured to extract feature points from a face image of the user manipulating the application, the face image obtained through an image sensor, compare the extracted feature points and feature points included in pre-defined expression information, and identify the expression of the user based on a result of the comparison.

The controller may be further configured to control a sensor to detect at least one of sweating amount information, muscle contraction information, finger tremor information, heart rate information, and pulse information of the user manipulating the application, and determine an emotional state of the user based on the at least one detected information.

The controller may be further configured to recommend another application to the user based on the manipulation information and the feeling information of the user.

In accordance with another aspect of the present disclosure, a non-transitory computer-readable recording medium stores at least one computer program code that is executed by a processor to perform operations of an application providing method.

MODE OF THE INVENTION

Figure 1:
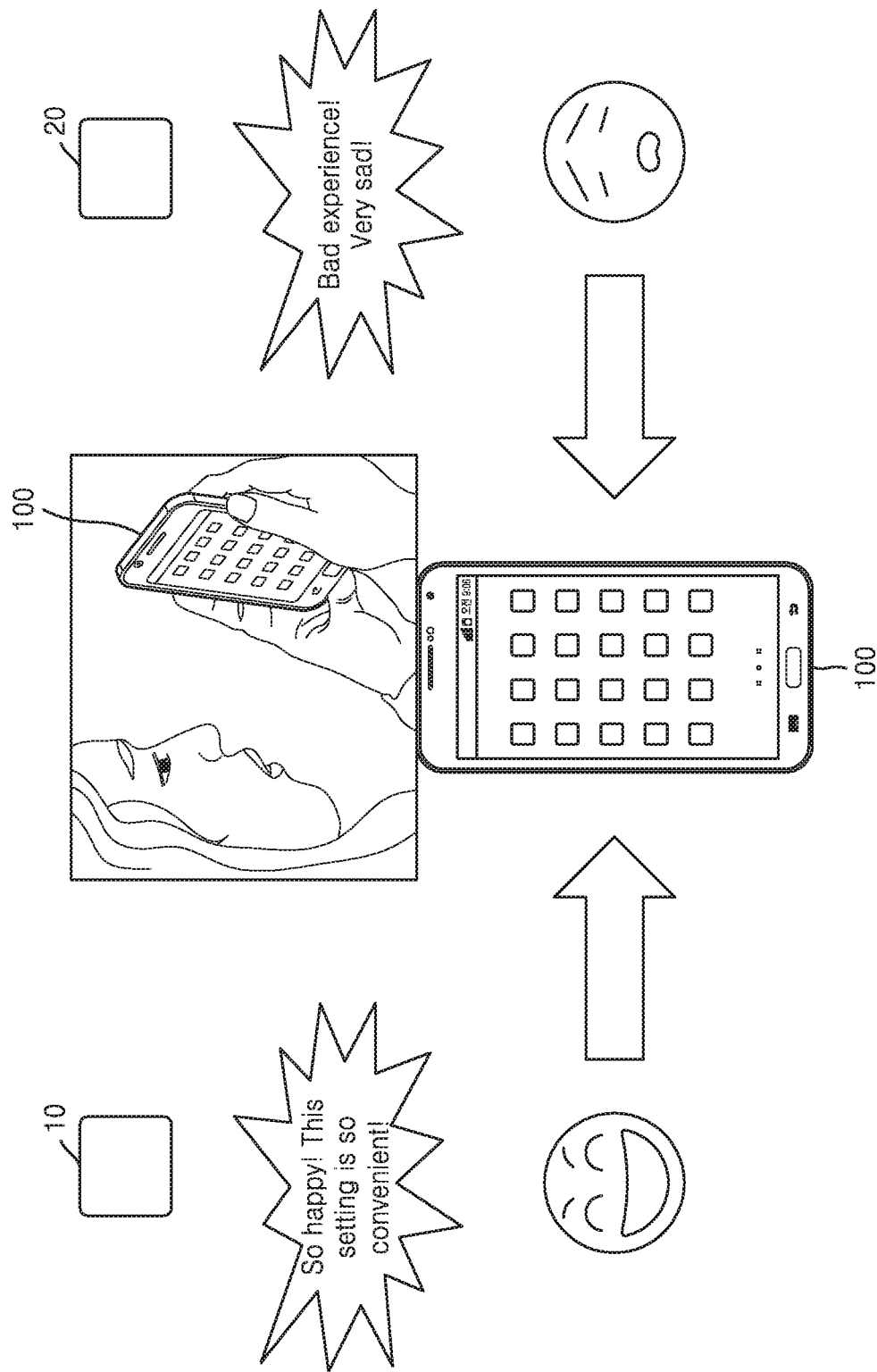
FIG. 1 is a diagram for describing an application providing system according to an embodiment.

In the present specification, the scope of a right of the present disclosure is clarified, and principles of the present disclosure are explained and embodiments are described to be executed by one of ordinary skill in the art. The embodiments may have different forms.

Throughout the specification, an "application" may denote a series of computer program groups designed to perform a specific task. An application described herein may vary. Examples of the application may include a web browser application, a camera application, a dictionary application, a translation application, a data transmitting application, a music reproducing application, a video reproducing application, a mail application, a messaging application, a social communicator application, a social media application, a map application, a photograph folder application, a broadcasting application, a game application, an exercise supporting application, a payment application, a memo application, a calendar application, and a phone book application, but are not limited thereto.

Throughout the specification, a user interface may denote a medium provided for an electronic device and a user to interact with each other. The user may manipulate the electronic device through the user interface, and the electronic device may display a result with respect to manipulation of the user through the user interface.

Throughout the specification, the same reference numerals denote the same elements. The present specification does not describe all elements of embodiments, and details general in the related fields or details overlapping between the embodiments may be omitted. The term 'part' or 'portion' used herein may be implemented in software or hardware, and a plurality of 'parts' or 'portions' may be implemented in one unit or element or one 'part' or 'portion' may include a plurality of units or elements, according to embodiments. Hereinafter, operation principles and embodiments of the present disclosure will be described with reference to accompanying drawings.

FIG. 1 is a diagram for describing an application providing system according to an embodiment.

Referring to FIG. 1, the application providing system according to an embodiment may include an electronic device 100. However, components shown in FIG. 1 are not all essential. The application providing system may include more than those shown in FIG. 1, or may include less than those shown in FIG. 1. For example, the application providing system may include the electronic device 100 and a server (not shown).

The electronic device 100 according to an embodiment may be embodied in one of various forms. Examples of the electronic device 100 may include a smart phone, a smart television (TV), a digital camera, a laptop computer, a tablet personal computer (PC), an electronic book terminal, a digital broadcasting terminal, a personal digital assistant (PDA), a portable multimedia player (PMP), a navigation device, an MP3 player, but are not limited thereto. The electronic device 100 described in the present specification may be a wearable device worn by a user. The wearable device include at least one of an accessory type device (for example, a watch, a ring, a bracelet, an anklet, a necklace, glasses, or a contact lens), a head-mounted device (HMD), a fabric or clothing-integrated device (for example, electronic clothes), a body-attached device (for example, a skin pad), and a bio-implant device (for example, an implantable circuit), but is not limited thereto. However, hereinafter, for convenience of description, it is described that the electronic device 100 is a mobile terminal.

According to an embodiment, the electronic device 100 may store, in a memory, or upload, to a server, manipulation information about manipulating an application by the user, and feeling information about the user's feelings in relation to the manipulation of the application. For example, the electronic device 100 may transmit manipulation information and feeling information of the user through a network. Here, the network may be embodied via a wireless communication technology or mobile communication technology, such as wireless fidelity (Wi-Fi), home radio frequency (RF), Bluetooth, HR WPAN, UWB, LR WPAN, IEEE1394, but is not limited thereto.

Meanwhile, according to an embodiment, the electronic device 100 may provide at least one application to the user. Here, the user may have a particular feeling towards an application while manipulating the application provided by the electronic device 100.

For example, the user may feel that a user interface of a first application 10 is very convenient. In this case, the user may have a positive feeling towards the first application 10 and frequently use the first application 10.

On the other hand, the user may feel that a user interface of a second application 20 is inconvenient. For example, when it is complicated or difficult to find a certain function from the second application 20, the user may have a negative feeling towards the second application 20 and not use the second application 20 often.

Accordingly, the electronic device 100 needs to determine a feeling of the user with respect to each application and adaptively modify a user interface of each application. For example, since the user has a positive feeling towards the first application 10, the electronic device 100 may maintain the user interface of the first application 10. On the other hand, since the user has a negative feeling towards the second application 20, the electronic device 100 may modify the user interface of the second application 20.

Hereinafter, an operation of the electronic device 100 adaptively modifying a user interface of an application based on a feeling of a user will be described with reference to FIG. 2.

Figure 2:
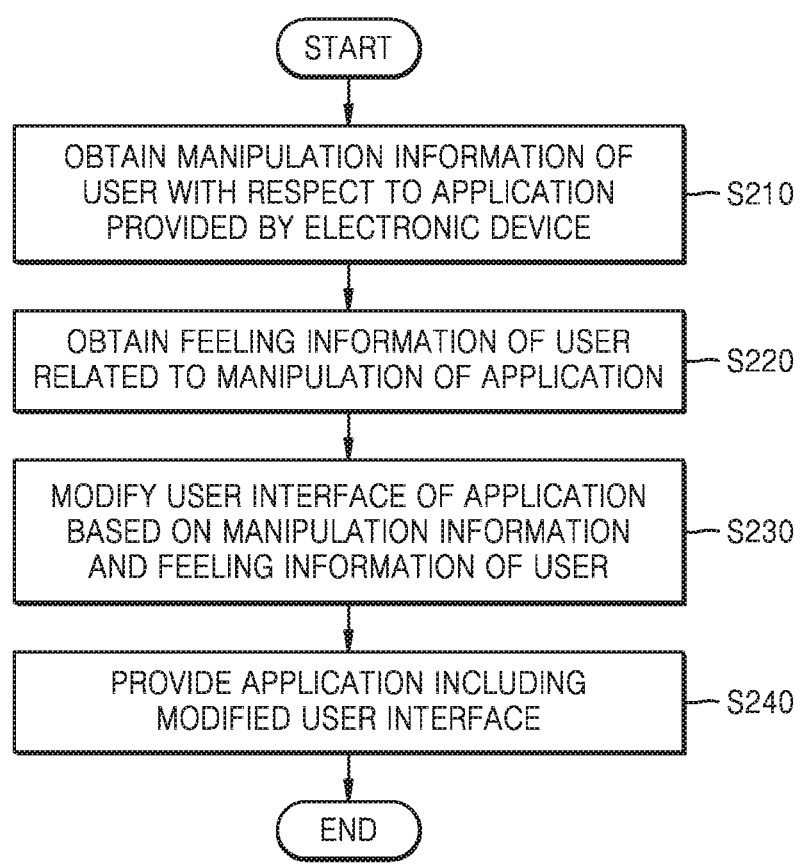
FIG. 2 is a flowchart for describing an application providing method of an electronic device, according to an embodiment.

FIG. 2 is a flowchart for describing an application providing method of the electronic device 100, according to an embodiment.

In operation S210, the electronic device 100 may obtain manipulation information of a user with respect to an application provided by the electronic device 100. The manipulation information of the user is information related to manipulating of at least one application executed in the electronic device 100, and for example, may include information about a function selected by the user from among functions provided by the application, information about force (hereinafter, a manipulation force) of manipulating the application, information about a frequency (hereinafter, a manipulation frequency) of using the application or each of the functions provided by the application, and information about a location (hereinafter, a manipulation location) of manipulating the application, but is not limited thereto. The manipulation information of the user will be described in detail later with reference to FIG. 3.

In operation S220, the electronic device 100 may obtain feeling information of the user related to manipulation of the application provided by the electronic device 100.

The feeling information of the user may be information about an emotional state of the user corresponding to manipulation of a particular application executed in the electronic device 100. The emotional state of the user may include, for example, anger, contempt, disgust, fear, happiness, sadness, surprise, or joy, but is not limited thereto. Here, anger, contempt, disgust, fear, and sadness may be classified as negative feelings, and happiness, surprise, and joy may be classified as positive feelings.

For example, the feeling information of the user may include a first feeling (for example, happiness) with respect to a first application, a second feeling (for example, anger) with respect to a second application, and a third feeling (for example, irritation) with respect to a third application.

According to an embodiment, the feeling information of the user may be information about an emotional state of the user corresponding to each function provided by an application. For example, the feeling information may include a fourth feeling (for example, surprise) with respect to a fourth function, a fifth feeling (for example, sadness) with respect to a fifth function, and a sixth feeling (for example, disgust) with respect to a sixth function, the fourth through sixth functions provided by the first application.

Meanwhile, according to an embodiment, the electronic device 100 may obtain the feeling information of the user from facial expression information of the user. Also, the electronic device 100 may obtain the feeling information of the user from physical change information of the user (for example, sweating amount information, muscle contraction information, finger tremor information, heart rate information, and pulse information). An operation of the electronic device 100 obtaining the feeling information of the user will be described in detail later with reference to FIGS. 4 through 7.

In operation S230, the electronic device 100 may modify a user interface of the application based on the manipulation information and the feeling information of the user.

According to an embodiment, the electronic device 100 may obtain analysis data with respect to manipulation of the application by analyzing the manipulation information and the feeling information of the user.

According to an embodiment, the electronic device 100 may determine whether to modify the user interface by analyzing the manipulation information and the feeling information of the user.

For example, when force of the user manipulating a first interface is equal to or higher than a reference value and the user is sad about the first interface, the electronic device 100 may determine to modify the first interface.

Also, when a manipulation frequency with respect to a second interface is high and the user is happy with the second interface, the electronic device 100 may determine to maintain the second interface.

When a user interface of an application is modified based on feeling information of a user, according to an embodiment, a feeling of the user, which is not related to manipulation of the application, may be reflected while modifying the user interface. However, when the user interface of the application is modified based on manipulation information and the feeling information of the user, the manipulation information of the user is considered together with the feeling information, and thus a feeling of the user, which is related to manipulation of the application, may be more accurately reflected than when the user interface is modified based only on the feeling information of the user.

According to an embodiment, modifying of a user interface of an application may mean that at least one of a function, a structure, an interface layout, and content is adjusted.

According to an embodiment, the electronic device 100 may modify a user interface based on preference of a user with respect to functions provided by an application. An operation of the electronic device 100 modifying the user interface based on the preference of the user with respect to the functions will be described in detail later with reference to FIGS. 8 and 9.

According to an embodiment, the electronic device 100 may change an arrangement of pieces of content based on preference of a user with respect to the pieces of content displayed in an application. For example, a piece of content preferred by the user may be disposed at a manipulation location frequently manipulated by the user.

The electronic device 100 may change a structure related to execution paths of functions while considering preference of a user with respect to a path for executing each of the functions provided by an application. An operation of the electronic device 100 changing the structure related to the execution paths of the functions will be described in detail later with reference to FIGS. 10 through 12.

According to an embodiment, the electronic device 100 may modify a user interface of an application while considering manipulation information and feeling information of another user. Here, the other user may be a user (for example, a family or a friend) connected to the user of the electronic device 100 through a social network, or may be an arbitrary user. An operation of the electronic device 100 modifying the user interface of the application while considering the manipulation and the feeling information of the other user will be described in detail later with reference to FIGS. 18 and 19.

In operation S240, the electronic device 100 may provide the application including the modified user interface to the user.

According to an embodiment, the electronic device 100 may execute the application in response to a user request, and provide the modified user interface to an execution screen of the application. For example, the electronic device 100 may display icons of functions preferred by the user on a main page.

Meanwhile, the electronic device 100 may modify the user interface by reflecting information about using habits. The information about using habits may include a personality of the user and preference of the user, but is not limited thereto.

According to an embodiment, the electronic device 100 may obtain the information about using habits from a behavior pattern of the user manipulating the application.

For example, a first user may first search for a type of product (for example, a vacuum cleaner) which the first user wants to purchase while manipulating a shopping application. Then, the first user may browse products obtained as the search results (for example, a first vacuum cleaner of a first company, a second vacuum cleaner of the first company, a third vacuum cleaner of a second company, etc). Next, the first user may select a product (for example, the third vacuum cleaner of the second company) which the first user wants to purchase from among the products.

Meanwhile, a second user may browse a plurality of types of products without deciding what type of product the second user wants to purchase while manipulating the shopping application. Then, the second user may select a product which the second user wants to purchase from among the plurality of types of products.

According to an embodiment, the electronic device 100 of the first user may reflect information about shopping habits of the first user while displaying a window for a categorical search on a main page of the shopping application.

According to an embodiment, the electronic device 100 manipulated by the second user may reflect information about shopping habits of the second user such that latest products or products frequently purchased by other users are sequentially displayed on a user interface of the shopping application.

According to an embodiment, the electronic device 100 may increase satisfaction of the user with respect to manipulation of the application by adaptively changing the user interface of the application based on a feeling of the user.

Figure 3:
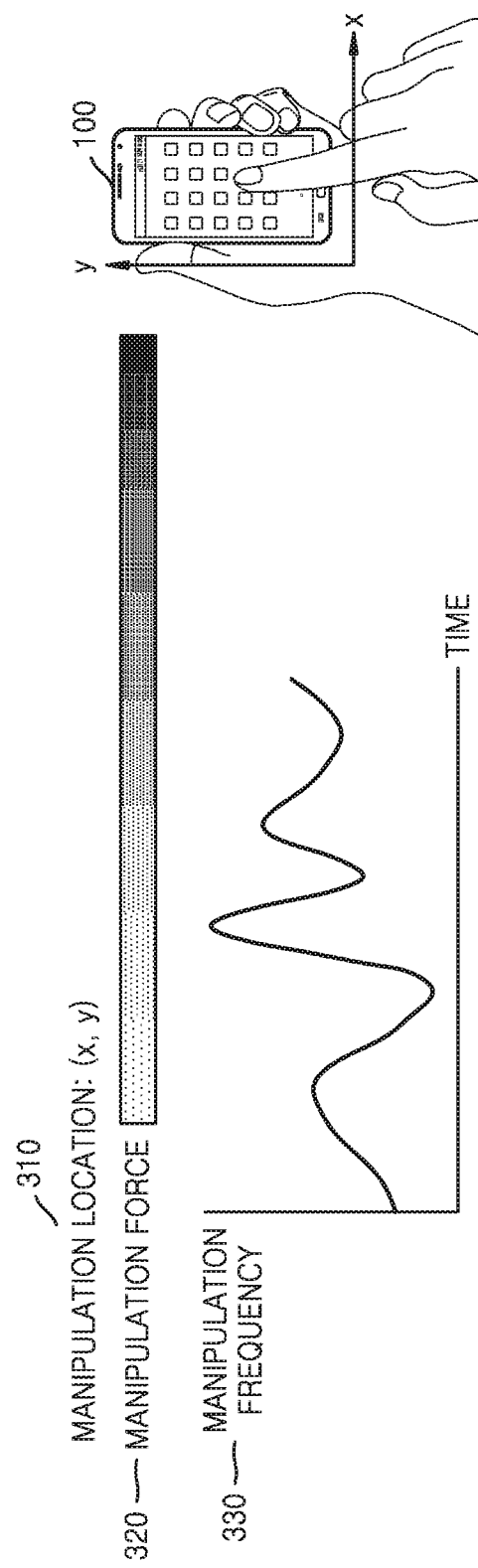
FIG. 3 is a diagram for describing manipulation information of a user, according to an embodiment.

FIG. 3 is a diagram for describing manipulation information of a user, according to an embodiment.

According to an embodiment, the electronic device 100 may obtain, as the manipulation information of the user, at least one of a manipulation location 310, a manipulation force, and a manipulation frequency 330 of the user.

The manipulation location 310 may denote a location of a point where a touch is detected on a screen of the electronic device 100. For example, when a coordinate value of an A point touched by the user is (X1, Y1), the manipulation location 310 may be indicated as (X1, Y1). The electronic device 100 may detect which part of the screen is touched by the user by using a touch sensor.

The manipulation force 320 is related to strength of touching the electronic device 100. The electronic device 100 may distinguish touch strength by using the touch sensor. As shown in a graph of the manipulation force 320, the darker the gradation, the higher the manipulation force.

The manipulation frequency 330 is an index indicating how often the user uses an application of a function of the application according to time, by measuring at least one of a time of using the application (or the function of the application) and the number of times the application (or the function of the application) is used. For example, the manipulation frequency 330 may include the number of times the application is clicked (or touched) according to the lapse of time.

According to an embodiment, the electronic device 100 may also consider manipulation information that varies according to a type of an application.

For example, the user manipulating a game application may perform manipulation of several attacks using great manipulation force at a particular manipulation location where a monster is, when attacking the monster in the game application.

Accordingly, the electronic device 100 may determine that, even when an execution screen of the game application is touched with greater force (or more frequently) than a force used by the user touching an execution screen of a general application (for example, a search application), the game application is not manipulated with great manipulation force (or more manipulation frequency).

Also, a general behavior pattern (or a using order) of the user, a personality of the user, or preference of the user may also be included in the manipulation information.

In FIG. 3, manipulation of the user is a touch input, but an embodiment is not limited thereto. For example, the manipulation of the user may include a key input, a voice input, a bending input, or the like. When the electronic device 100 is a flexible display, the manipulation information of the user may include a bending location, a bending angle, bending force, etc.

Figure 4:
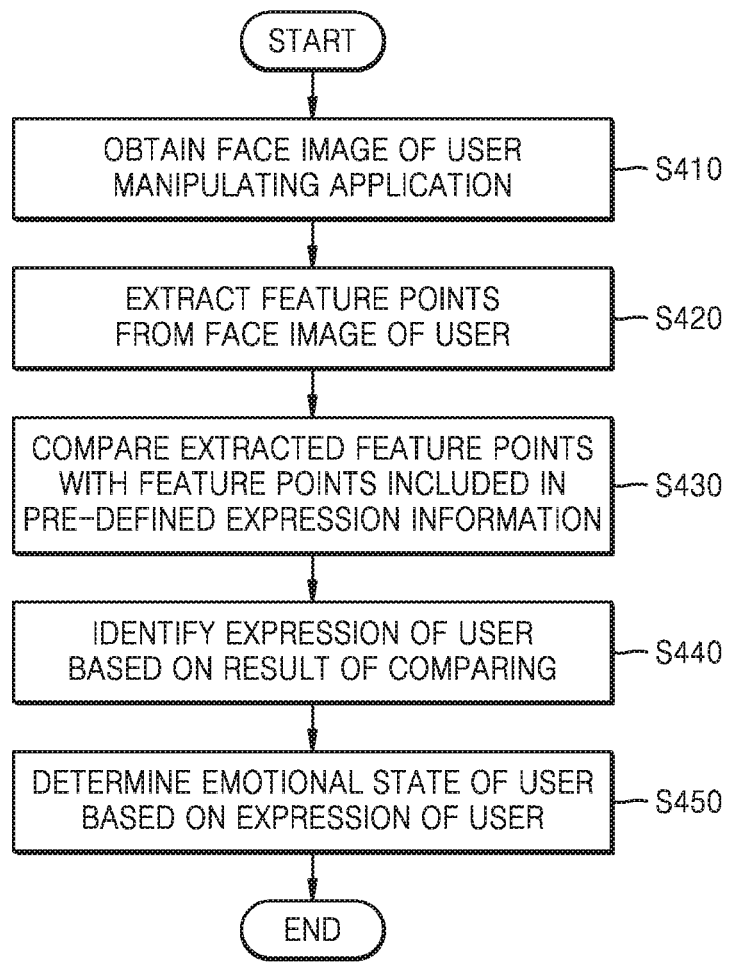
FIG. 4 is a flowchart for describing a feeling information obtaining method, wherein feeling information is with respect to a face of a user, according to an embodiment.

FIG. 4 is a flowchart for describing a feeling information obtaining method, wherein feeling information is shown on a face of a user, according to an embodiment.

In operation S410, the electronic device 100 may obtain a face image of the user manipulating an application. According to an embodiment, the electronic device 100 may obtain the face image of the user by using an image sensor of a camera. The face image of the user may be a still image or a moving image.

In operation S420, the electronic device 100 may extract feature points from the face image of the user.

According to an embodiment, the feature points may be distributed mainly around eyes, a mouth, a forehead, eyebrows, etc., which have abundant movements according to an expression change. Accordingly, the electronic device 100 may extract the feature points mainly from round the eyes, the mouth, the forehead, the eyebrows etc. Meanwhile, even when an expression changes, movement of a nose is insignificant, and thus the electronic device 100 may not extract feature points from the nose for a quick expression identification speed.

In operation S430, the electronic device 100 may compare the feature points extracted from the face image of the user with feature points included in pre-defined expression information.

The pre-defined expression information may be information about expressions of a human being, which are classified using a certain standard. For example, the pre-defined expression information may include a face image according to an expression, information about a feature point (or a particular vector) corresponding to an expression, etc., but is not limited thereto.

According to an embodiment, the pre-defined expression information may be stored in a memory of the electronic device 100. In this case, the electronic device 100 may extract the pre-defined expression information from the memory. Also, according to an embodiment, the electronic device 100 may receive the pre-defined expression information from a server or an external device (for example, an expression classifier).

The pre-defined expression information will be described in detail later with reference to FIG. 5.

In operation S440, the electronic device 100 may identify an expression of the user based on a result of comparing the feature points extracted from the face image of the user and the feature points included in the pre-defined expression information.

According to an embodiment, the electronic device 100 may search for feature points included in the pre-defined expression information, which mostly match the feature points extracted from the face image of the user, and identify a corresponding pre-defined expression as the expression of the user.

Figure 5:
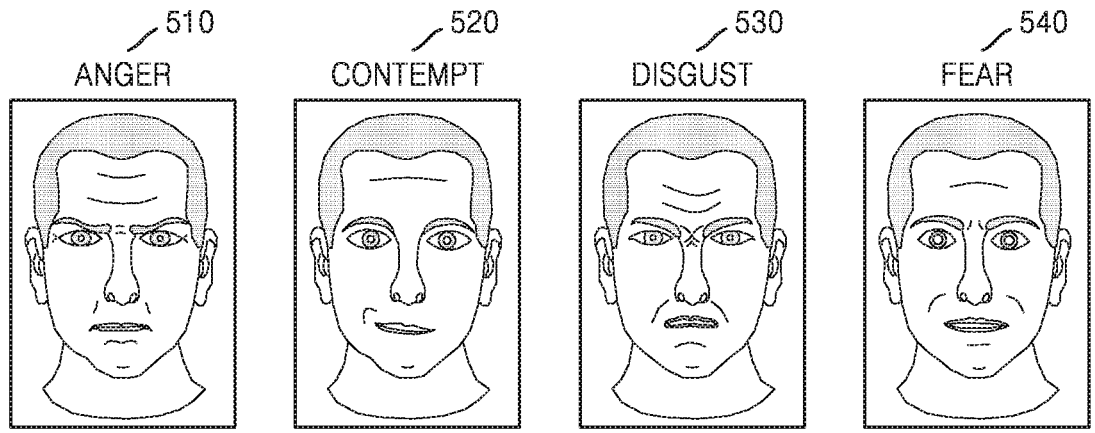
FIG. 5 is a diagram for describing pre-defined expression information according to an embodiment.

For example, referring to FIG. 5, an expression 550 indicating happiness is characterized with a slight smile, wrinkles around the eyes according to movement of muscles around the eyes, and slightly lifted cheekbones. Accordingly, when first feature points extracted from the face image of the user are similar to second feature points included in the expression 550 indicating happiness, the electronic device 100 may identify the expression 550 indicating happiness as the expression of the user.

According to an embodiment, the electronic device 100 may use an external device to identify the expression of the user. The electronic device 100 may transmit the face image of the user to the external device. The external device may extract the feature points from the face image of the user and compare the extracted feature points with feature points included in expression information pre-defined in the external device so as to identify the expression of the user. Also, the external device may use a support vector machine model or a neural network model to increase accuracy of expression identification. The external device may transmit information about the identified expression of the user to the electronic device 100.

In operation S450, the electronic device 100 may determine an emotional state of the user based on the expression of the user.

The electronic device 100 according to an embodiment may determine, as the emotional state of the user, a pre-defined emotional state indicated by pre-defined expression information that best matches the identified expression of the user. For example, when the electronic device 100 identified the expression 550 indicating happiness as the expression of the user, the emotional state of the user may be determined to be happiness.

FIG. 5 is a diagram for describing pre-defined expression information according to an embodiment.

Psychological studies have found that people make faces showing mainly 7 emotional states. These 7 emotional states are anger, contempt, disgust, fear, happiness, sadness, and surprise.

For example, an expression 510 indicating anger may be defined by wrinkles across a forehead and down the middle of the forehead, and lifted eyebrow edges, and an expression 520 indicating contempt may be defined by dropped eyes and one lifted corner of a mouth.

Also, an expression 530 indicating disgust may be defined by wrinkles on the middle of a forehead and a lifted upper lip.

Also, an expression 540 indicating fear may be defined by lifted eyebrows, knitted eyebrows while being gathered toward each other, lifted upper eyelids, tense lower eyelids, and a slightly stretched mouth towards the ears.

Also, the expression 550 indicating happiness may be defined by a slight smile, wrinkles around the eyes according to movement of muscles around the eyes, and slightly lifted cheekbones.

Also, an expression 560 indicating sadness may be defined by slightly dropped upper eyelids, a lost focus of eyes, and dropped corners of a mouth.

Also, an expression 570 indicating surprise may be defined by big eyes, lifted eyebrows, and an opened mouth. Characteristics of pre-defined expressions described above are examples, and the expressions may be re-defined by other characteristics.

Figure 6:
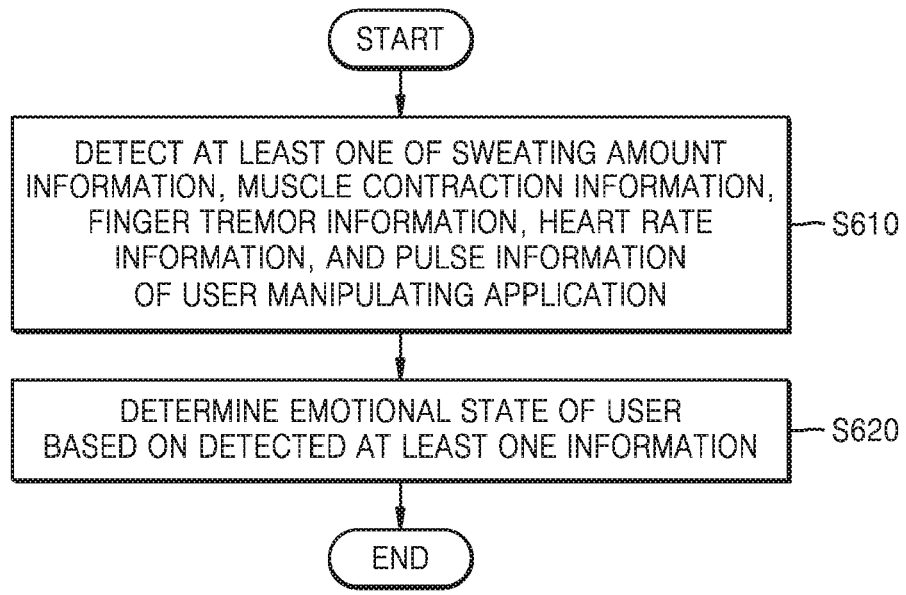
FIG. 6 is a flowchart for describing a method of determining a user's emotional state, according to an embodiment.

FIG. 6 is a flowchart for describing a method of determining a user's emotional state, according to an embodiment.

In operation S610, the electronic device 100 may detect at least one of sweating amount information, muscle contraction information, finger tremor information, heart rate information, and pulse information of a user manipulating an application.

According to an embodiment, the electronic device 100 may obtain the heart rate information of the user manipulating the application, through a heart rate sensor using an optical sensor. The heart rate sensor may be located inside the electronic device 100 or located outside the electronic device 100.

Figure 7:
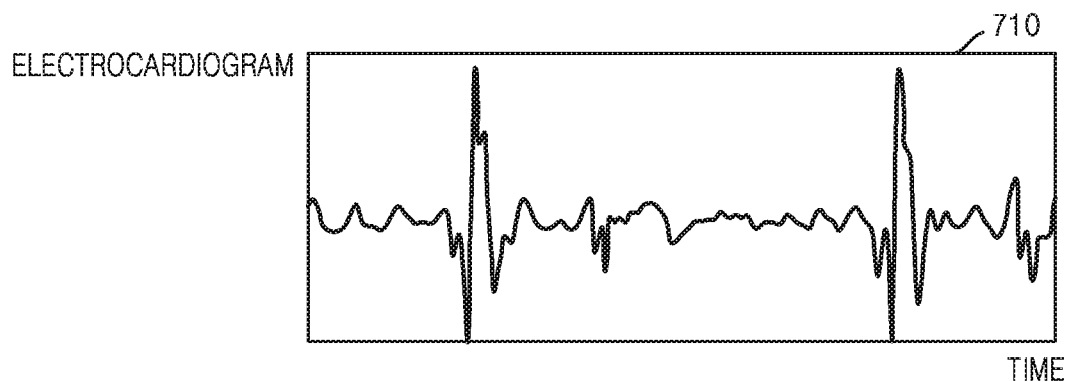
FIG. 7 illustrates a table for determining an emotional state, according to an embodiment.

For example, referring to FIG. 7, the electronic device 100 may obtain an electrocardiogram (ECG) diagram 710. In the ECG diagram 710 according to an embodiment, a horizontal axis denotes time and a vertical axis denotes ECG. The electronic device 100 may determine whether a beats per minute (bmp) of the user exceeds a pre-set value through the ECG diagram 710.

According to an embodiment, physical change information of the user (for example, the sweating amount information, the muscle contraction information, the finger tremor information, the heart rate information, and the pulse information) may be obtained by at least one sensor of the electronic device 100.

In operation S620, the electronic device 100 may determine an emotional state of the user based on the detected at least one information. Alternatively, the physical change information of the user may be measured by a wearable device located outside the electronic device 100. In this case, the electronic device 100 may receive the physical change information of the user from a wearable device.

According to an embodiment, the electronic device 100 may check the emotional state according to the physical change information of the user by referring to an emotional state determining table stored in a memory.

An emotional state determining table 720 will be described with reference to FIG. 7. The emotional state determining table 720 may be a table in which an emotional state corresponding to physical change information of the user is defined.

For example, when a temperature/humidity sensor detects that a sweating amount of the user is higher than a first threshold value, the electronic device 100 may determine that the user feels fear by referring to the emotional state determining table 720.

Also, for example, when the temperature/humidity sensor detects that the sweating amount of the user is lower than or equal to the first threshold value, the electronic device 100 may determine that the user feels tranquility by referring to the emotional state determining table 720.

Also, for example, when an electromyography (EMG) sensor detects that a muscle contraction level is higher than a second threshold value, the electronic device 100 may determine that the user feels disgust by referring to the emotional state determining table 720.

Also, for example, when an acceleration sensor, a gyroscope sensor, and an image sensor detect that a finger tremor level of the user is higher than a third threshold value, the electronic device 100 may determine that the user feels anger by referring to the emotional state determining table 720.

Also, for example, when a heart rate sensor detects that a heart rate is higher than a fourth threshold value, the electronic device 100 may determine that the user feels surprise by referring to the emotional state determining table 720.

Also, for example, when a pulse sensor determines that a pulse rate of the user is higher than a fifth threshold value, the electronic device 100 may determine that the user feels joy by referring to the emotional state determining table 720, and when the pulse sensor determines that the pulse rate of the user is lower than or equal to a sixth threshold value, the electronic device 100 may determine that the user feels sadness.

Figure 8:
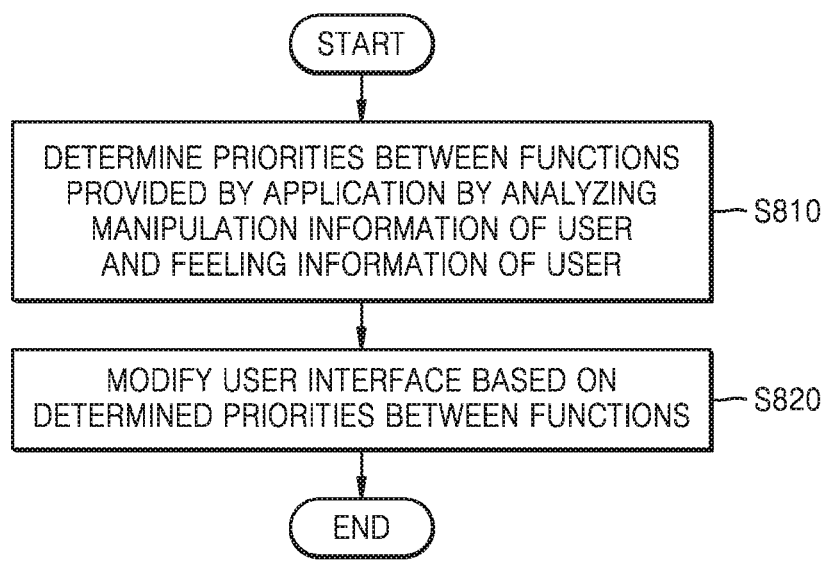
FIG. 8 is a flowchart for describing a method of determining, by an electronic device, priorities between functions provided by an application, according to an embodiment.

FIG. 8 is a flowchart for describing a method of determining priorities between functions provided by an application, according to an embodiment.

In operation S810, the electronic device 100 may determine the priorities between the functions provided by the application by analyzing manipulation information of a user and feeling information of the user.

Figure 9:
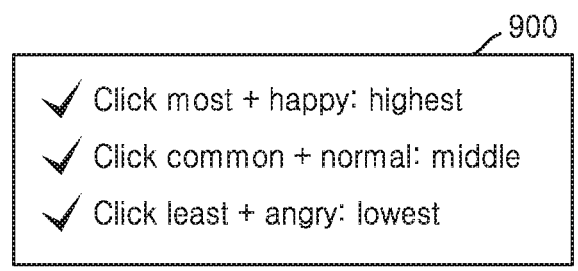
FIG. 9 is a diagram for describing an operation of determining, by an electronic device, priorities between functions provided by an application, according to an embodiment.

An operation of determining priorities between functions, according to an embodiment, will be described with reference to FIG. 9.

According to an embodiment, the electronic device 100 may determine the priorities between the functions provided by the application by reflecting a click manipulation number of times and the feeling information of the user. Click manipulation according to an embodiment may be performed as the user clicks a particular point of a screen by using a keyboard or a mouse, or touches the screen by using a finger or a stylus pen.

For example, as shown in a chart 900, when a clicked number of a first function provided by a first application is high and the user is happy about the first function, the first function may have a highest priority.

Also, when a clicked number of a second function provided by the first application is common and the user feels normal with respect to the second function, the second function may have about middle priority. When a clicked number of a third function provided by the first application is low and the user is angry with the third function, the third function may have a low priority.

In operation S820, the electronic device 100 may modify a user interface based on the determined priorities between the functions.

According to an embodiment, the electronic device 100 may modify the user interface such that the functions are arranged in an order from the highest priority. For example, the electronic device 100 may locate an icon of the first function having the highest priority at the top of the screen.

Also, for example, the electronic device 100 may additionally display, on a main page, or may display, on a popup window, an icon of a function having a high priority, for quick manipulation by the user.

According to an embodiment, the electronic device 100 may determine not to provide a popup window to the user with respect to the third function having the low priority. Here, via an additional setting of the user, the popup window with respect to the third function may be displayed again.

Figure 10:
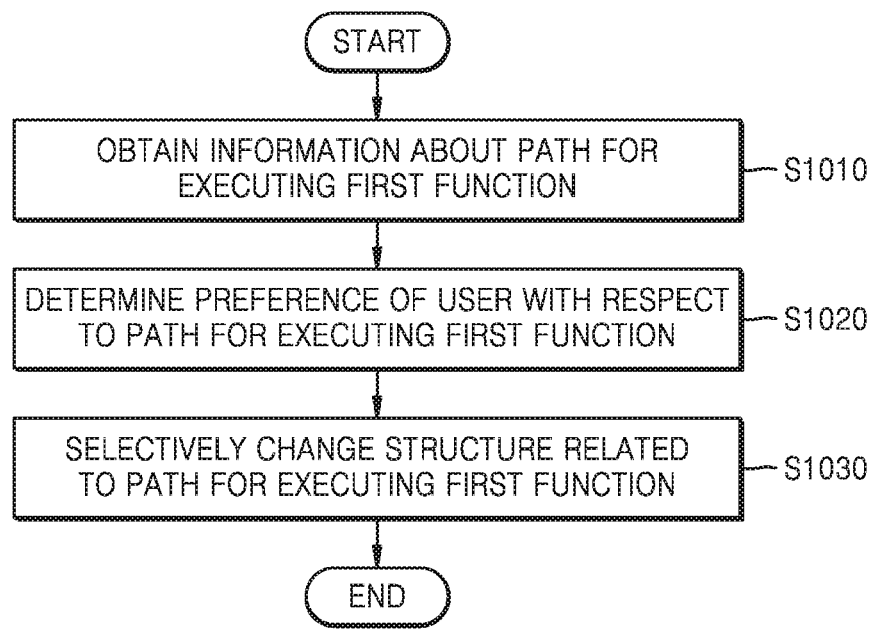
FIG. 10 is a flowchart for describing a method of changing a structure related to an execution path of a function provided by an application, according to an embodiment.
Figure 11:
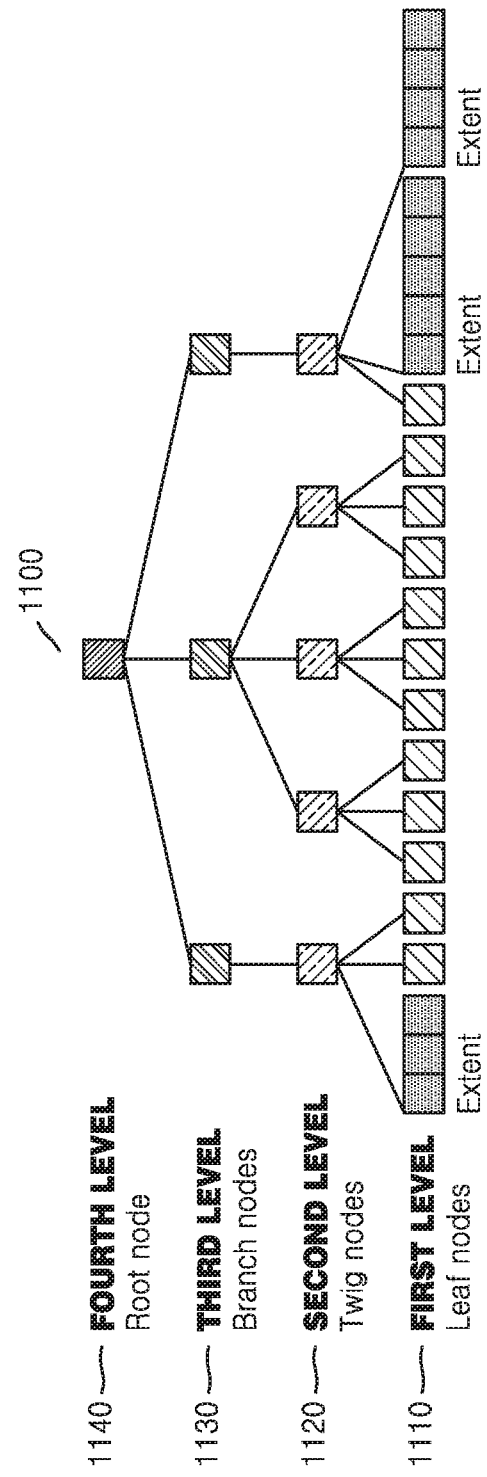
FIG. 11 is a diagram illustrating a structure of an application, according to an embodiment.

FIG. 10 is a flowchart for describing a method of changing a structure related to an execution path of a function provided by an application, according to an embodiment.

In operation S1010, the electronic device 100 may obtain information about a path for executing a first function.

Here, the information about the path for executing the first function may include identification information about a goal page providing the first function and information about an icon (button) for moving to the goal page.

For example, referring to FIG. 1, when the first function is in a leaf node of a first level 1110 of an application structure 1100, the electronic device 100 may obtain the information about the path of the second function that, in order to execute the first function, the leaf node of the first level 1110 needs to be reached from a root node of a fourth level 1140 through a branch node of a third level 1130 and a twig node of a second level 1120.

Also, when the first function is in the root node of the fourth level 1140 of the application structure 1110, the user may execute the first function immediately on a main page of the application without having to pass through a separate path. Here, the information about the path for executing the first function may be information about a first icon for executing the first function displayed on the main page.

In operation S1020, the electronic device 100 may determine preference of the user with respect to the path for executing the first function.

The preference according to an embodiment indicates whether a user prefers or does not prefer a path for executing a certain function, and the electronic device 100 may determine the preference based on manipulation information and feeling information of the user.

For example, when the user frequently uses the first function or prefers the first function compared to a complicated path for executing the first function of the leaf node as described above, the user may have a negative feeling about the path for executing the first function. The electronic device 100 may obtain the manipulation information and the feeling information of the user by using the method of obtaining the manipulation information and the feeling information of the user described above, and determine the preference of the user by reflecting the obtained information.

According to an embodiment, the electronic device 100 may calculate a preference value by digitizing a preference level with respect to a path for executing a certain function. The electronic device 100 may determine preference of the user by comparing the calculated preference value and a threshold value.

The threshold value is a value pre-set by the electronic device 100, and may be set to be high when a structure of an application is to be frequently changed. Also, the threshold value may be re-set by the user.

According to an embodiment, when the preference value is equal to or greater than the threshold value, the electronic device 100 may determine that the user prefers the structure of the application with respect to the path for executing the first function.

According to an embodiment, when the reference value is smaller than the threshold value, the electronic device 100 may determine that the user does not prefer the structure of the application with respect to the path for executing the first function.

In operation S1030, a structure related to the path for executing the first function may be selectively changed based on the preference of the user.

According to an embodiment, when it is determined that the structure related to the path for executing the first function is preferred, the electronic device 100 does not need to change the structure, and thus may maintain a current structure with respect to the path for executing the first function.

According to an embodiment, when it is determined that the user does not prefer the structure related to the path for executing the first function, the electronic device 100 may change the structure related to the path for executing the first function.

For example, when the first function is a function not preferred by the user, the electronic device 100 may change a location of the first icon for executing the first function to a page of a node having a level lower than that before the change.

An operation of the electronic device 100 according to an embodiment changing the structure of the application will be described in detail with reference to FIG. 12.

Figure 12:
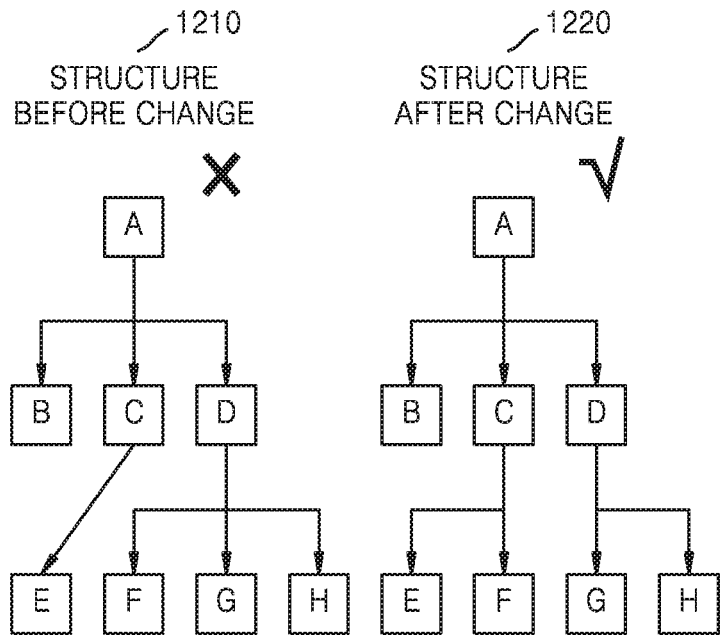
FIG. 12 is a diagram showing a structure of an application before and after a change, according to an embodiment.

FIG. 12 is a diagram showing a structure of an application before and after a change, according to an embodiment.

A structure 1210 before a change, according to an embodiment, is set such that a user may move from a D page of a level 2 node to an F, G, or H page of a level 1 node. For example, let's assume that in the structure 1210 before the change, the user often uses a second path of moving to a C page before moving to the F page, and moving to the D page and then to the F page rather than a first path of moving from the D page immediately to the F page. The user often goes to the C page before going to the F page, and the user may be unsatisfied with the first path of moving to the F page through the D page. Thus, as shown in a structure 1220 after the change, the electronic device 100 may change a structure such that the F page that was connected to the D page is connected the C page so that the user immediately moves from the C page to the F page.

Figure 13:
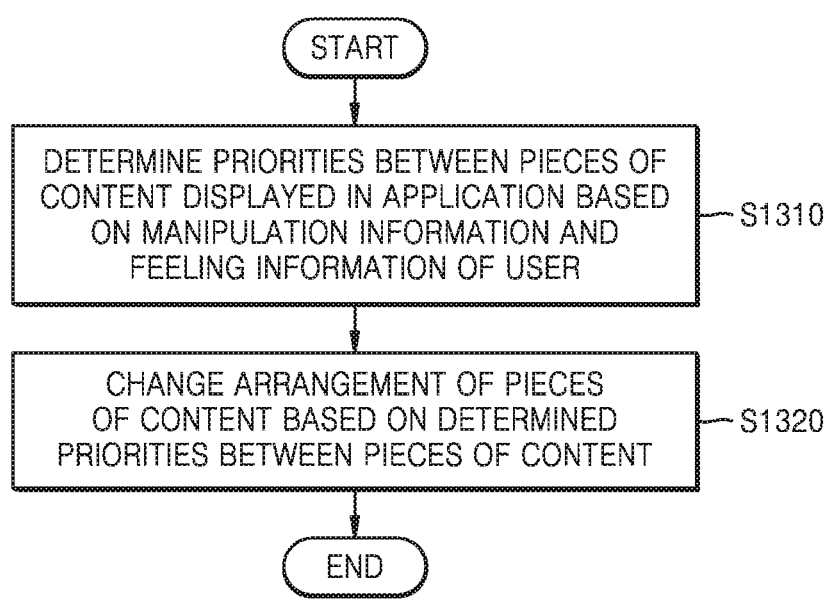
FIG. 13 is a flowchart for describing a method of changing an arrangement of pieces of content of an application, according to an embodiment.

FIG. 13 is a flowchart for describing a method of changing an arrangement of pieces of content of an application, according to an embodiment.

In operation S1310, the electronic device 100 may determine priorities between pieces of content displayed in an application based on manipulation information of a user and feeling information of the user.

An operation of determining the priorities between the pieces of content displayed in the application, according to an embodiment, will be described with reference to FIG. 14.

According to an embodiment, in a message application 1410, the electronic device 100 may determine a person who frequently exchanges messages with the user as having a high priority.

According to an embodiment, in a mail application 1420, the electronic device 100 may align pieces of content based on people who exchanged mail with the user, and determine a recently received mail as having a high priority.

According to an embodiment, in a memo application 1430, the electronic device 100 may determine a piece of content that has a closest deadline written on a memo as having a high priority.

In operation S1320, the electronic device 100 may change an arrangement of the pieces of content based on the determined priorities between the pieces of content.

The operation of changing the arrangement of the pieces of content, according to an embodiment, will be described with reference to FIG. 14.

Figure 14:
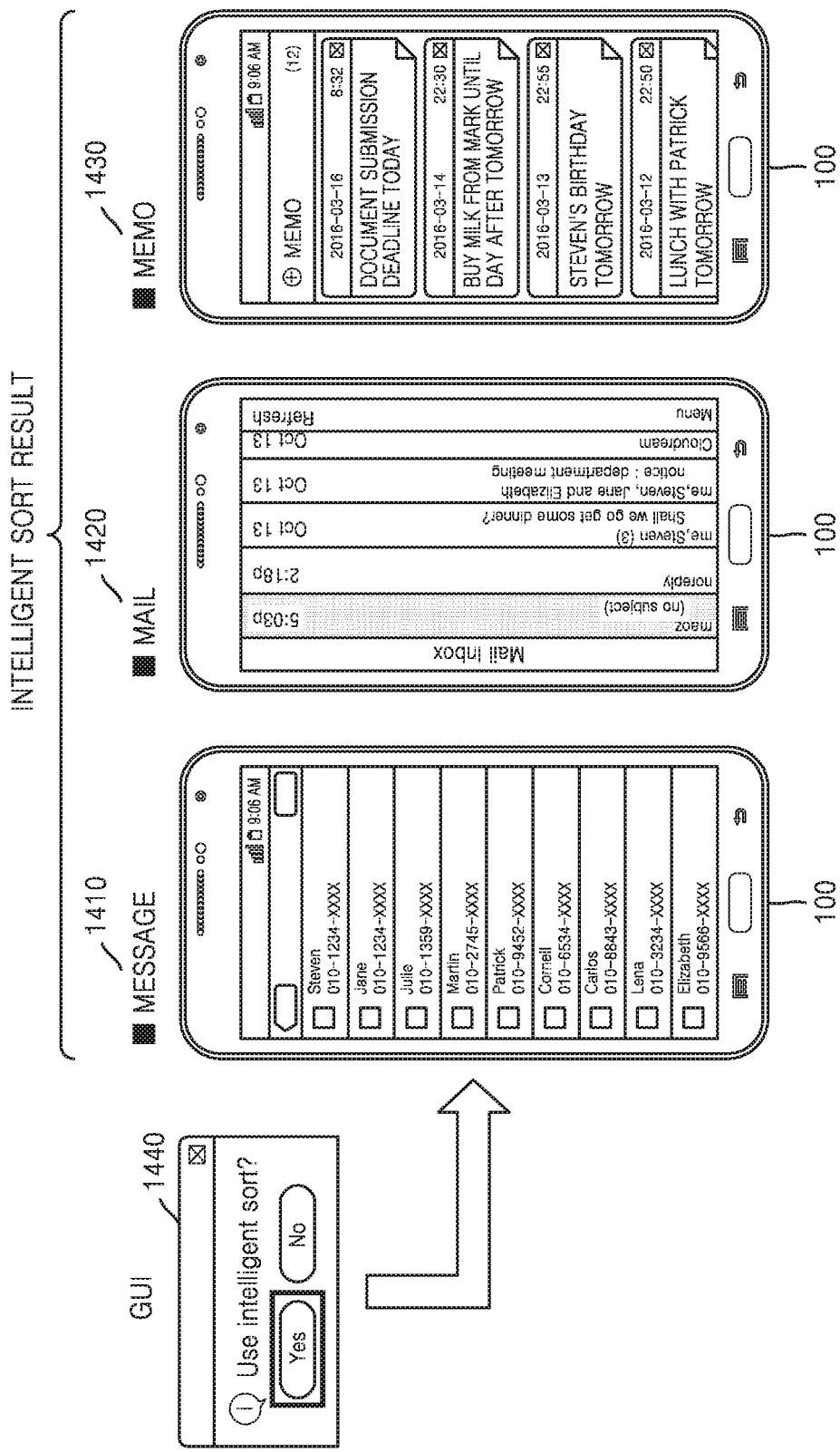
FIG. 14 is a diagram for describing an operation of changing an arrangement of pieces of content of an application, according to an embodiment.

FIG. 14 is a diagram for describing the operation of changing the arrangement of the pieces of content of the application, according to an embodiment.

According to an embodiment, when the user answers "Yes" in response to a graphic user interface (GUI) 1440 asking "Use intelligent sort?" in the message application 1410, the electronic device 100 may arrange the pieces of content in an order of people who frequently exchange messages with the user according to an intelligent sort function in which the pieces of content are arranged based on the operation of determining the priorities as described above.

According to an embodiment, when the user answers "Yes" in response to the GUI 1440 asking "Use intelligent sort?" in the mail application 1420, the electronic device 100 may align and arrange related mails based on people who exchanged mails with the user according to the intelligently sort function in which the pieces of content are arranged according to the determined priorities, and display a recently received mail at the top.

For example, when the user (me) of the electronic device 100 received a mail from Steven, the user sent a reply to Steven, and then Steven again transmitted a reply to the user, the electronic device 100 may arrange pieces of content by aligning the three mails as me, Steven(3), according to the intelligently sort function. Also, since a mail received today from maoz is received more recently than the reply received on October 13 from Steven, the mail received from maoz may be arranged above the reply received from Steven.

According to an embodiment, when the user answers "Yes" in response to the GUI 1440 asking "Use intelligent sort?" in the memo application 1430, the electronic device 100 may arrange the pieces of content in an order of deadlines written on memos according to the intelligently sort function in which the pieces of content are arranged according to the determined priorities.

For example, when today's date is Mar. 16, 2016, memos "document submission deadline today" and "buy milk from market by the day after tomorrow", whose deadlines are today, may be arranged at the top and "Steven's birthday tomorrow" and "Lunch with Patrick tomorrow", whose deadlines have passed, at the bottom.

According to an embodiment, when the user answers "No" in response to the GUI 1440 asking "Use intelligent sort?", the electronic device 100 may not use the intelligently sort function and not change the arrangement of the pieces of content.

Figure 15:
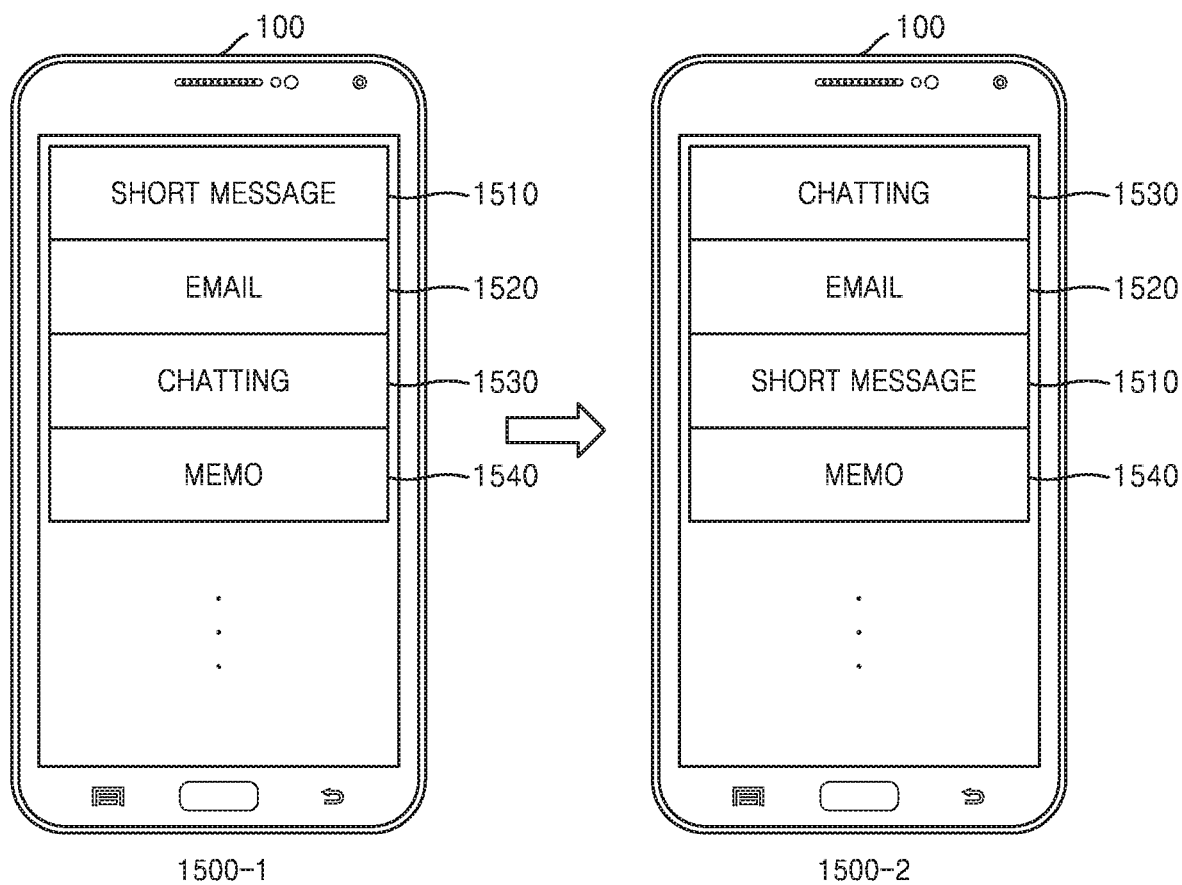
FIG. 15 is a diagram for describing an operation of changing an arrangement of applications, according to an embodiment.

FIG. 15 is a diagram for describing an operation of changing an arrangement of applications, according to an embodiment.

Referring to a reference numeral 1500-1 of FIG. 15, the electronic device 100 may arrange, in one page, a short message application 1510, an email application 1520, a chatting application 1530, and a memo application 1540, which are the same type of applications. Also, the electronic device 100 may obtain manipulation information and feeling application of a user manipulating the short message application 1510, the email application 1520, the chatting application 1530, or the memo application 1540. Here, the electronic device 100 may determine preference of the user with respect to each of the applications 1510 to 1540 by using the manipulation information and the feeling information of the user.

For example, when a manipulation frequency of the chatting application 1530 is higher than a manipulation frequency of the email application 1520, and the user has a very positive emotional state with respect to the chatting application 1530, the electronic device 100 may determine that the chatting application 1530 is more preferred than the email application 1520.

Also, for example, when a manipulation frequency of the short message application 1510 is lower than a manipulation frequency of the email application 1520, and the user has a normal emotional state with respect to the short message application 1510, the electronic device 100 may determine that the short message application 1510 is less preferred than the email application 1520.

Referring to a reference numeral 1500-2 of FIG. 15, the electronic device 100 may change an arrangement of the applications 1510 to 1540 based on the preference of the user with respect to each of the applications 1510 to 1540. For example, the electronic device 100 may change the arrangement to an order of the chatting application 1530, the email application 1520, the short message application 1510, and the memo application 1540.

Figure 16:
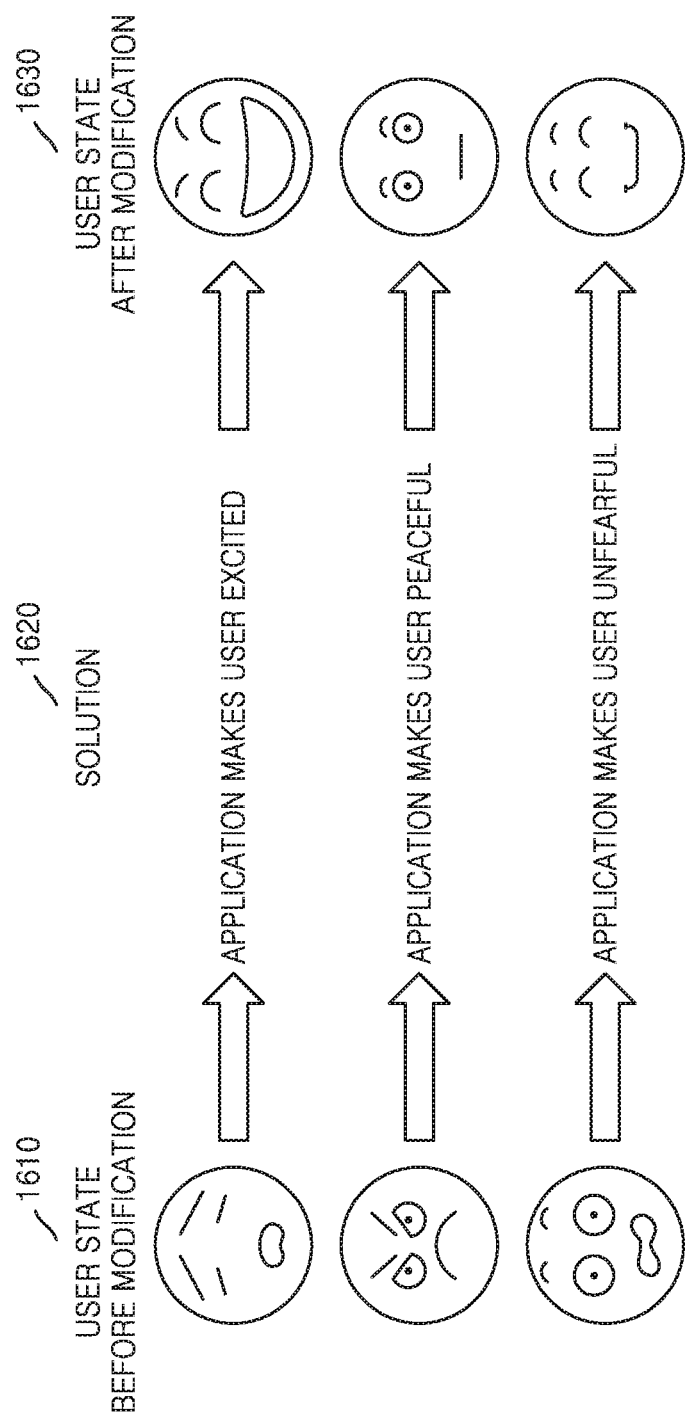
FIG. 16 is a diagram for describing a change in a state of a user in response to a modification of a user interface of an application, according to an embodiment.

FIG. 16 is a diagram for describing a change in a state of a user in response to a modification of a user interface of an application, according to an embodiment.

According to an embodiment, when a user state 1610 with respect to a first user interface before modification is a bored state, a user state 1630 with respect to a modified first user interface may be changed to an excited state.

According to another embodiment, when the user state 1610 with respect to a second user interface before modification is a displeased state, the user state 1630 with respect to a modified second user interface may be changed to a peaceful state.

Also, according to another embodiment, when the user state 1610 with respect to a third application before modification is a fearful state, the user state 1630 with respect to a modified third user interface may be changed to an unfearful state.

According to an embodiment, the electronic device 100 may improve user experience (UX) with respect to an application by obtaining manipulation information and feeling information of a user without a separate user input, and modifying a user interface by reflecting the obtained information.

Figure 17:
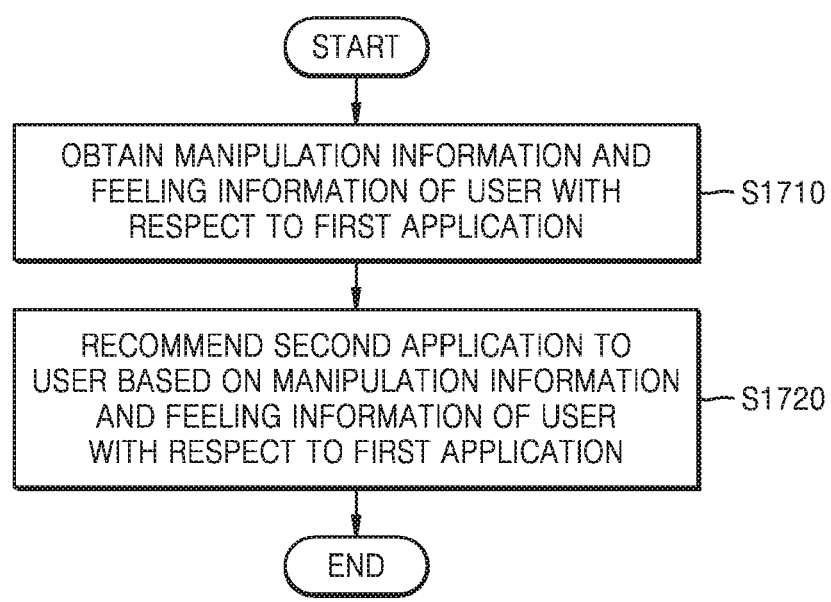
FIG. 17 is a flowchart for describing a method of recommending another application to a user, according to an embodiment.

FIG. 17 is a flowchart for describing a method of recommending another application to a user, according to an embodiment.

In operation S1710, the electronic device 100 may obtain manipulation information of a user and a feeling information of the user with respect to a first application. Since operation S1710 corresponds to operations S210 to S220 of FIG. 2, details thereof are not provided again.

In operation S1720, the electronic device 100 may recommend a second application to the user based on the manipulation information and the feeling information of the user with respect to the first application.

According to an embodiment, when a manipulation frequency of the user with respect to the first application is low and an emotional state of the user with respect to the first application is negative, the electronic device 100 may determine that the user is not satisfied with the first application. In this case, the electronic device 100 may recommend the second application instead of the first application.

According to an embodiment, the second application may be the same type as the first application. Alternatively, the second application may be a different version or a latest version of the first application.

Figure 18:
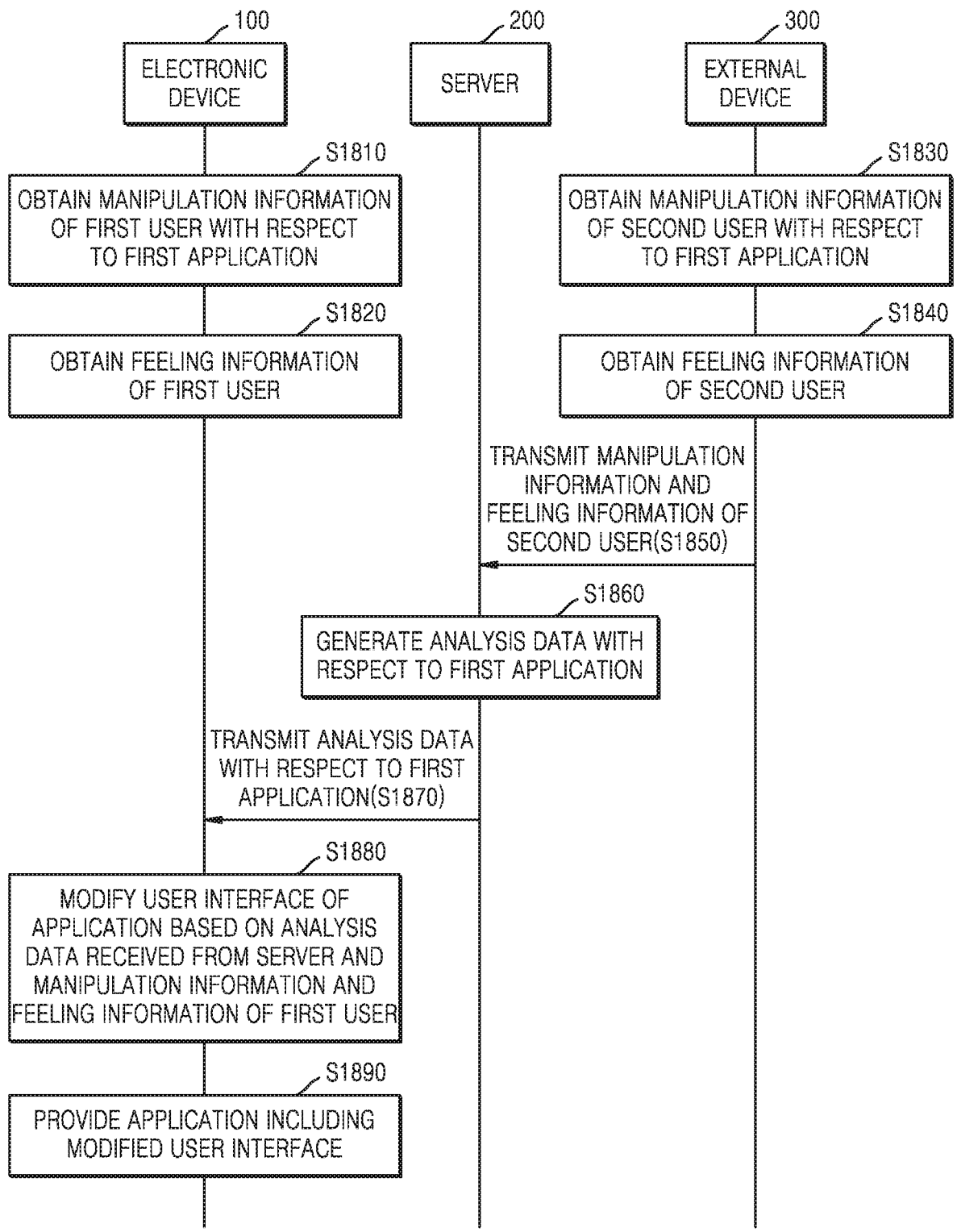
FIG. 18 is a flow diagram for describing a method of modifying a user interface of an application while considering manipulation information and feeling information of another user, according to an embodiment.

FIG. 18 is a flow diagram for describing a method of modifying a user interface of an application while considering manipulation information and feeling information of another user, according to an embodiment.

In operation S1810, the electronic device 100 may obtain manipulation information of a first user with respect to a first application. Since operation S1810 corresponds to operation S210 of FIG. 2, details thereof are not provided again.

In operation S1820, the electronic device 100 may obtain feeling information of the first user with respect to the first application. Since operation S1820 corresponds to operation S220 of FIG. 2, details thereof are not provided again.

In operation S1830, an external device 300 may obtain manipulation information of a second user with respect to the first application. Here, the number of external devices 300 may be one or more. When there are a plurality of the external devices 300, the external devices 300 may further obtain manipulation information of a plurality of users, such as third to fifth users.

The manipulation information of the second user with respect to the first application may include information about a function selected by the second user from among functions provided by the first application, information about force (hereinafter, a manipulation force) of manipulating the first application, information about a frequency (hereinafter, a manipulation frequency) of using the first application or each of the functions provided by the first application, and information about a location (hereinafter, a manipulation location) of manipulating the first application, but is not limited thereto.

In operation S1840, the external device 300 may obtain feeling information of the second user with respect to the first application. Also, when there are a plurality of the external devices 300, the external devices 300 may further obtain feeling information of a plurality of users, such as the third to fifth users, with respect to the first application.

The feeling information of the second user, according to an embodiment, may be information about an emotional state of the users of the external devices 300 corresponding to manipulation of the first application. For example, the feeling information of each of the users of the external devices 300 may include a second feeling of the second user and a third feeling of the third user.

According to an embodiment, the feeling information of the second user may be information about emotional states of the users of the external devices 300 with respect to each of the functions provided by the first application. For example, the feeling information of each of the users of the external devices 300 may include a fourth feeling of the second user with respect to a first function provided by the first application, a fifth feeling of the third user with respect to the first function provided by the first application, a sixth feeling of the fourth user with respect to a second function provided by the first application, and a seventh feeling of the third user with respect to a third function provided by the first application.

In operation S1850, the external device 300 may transmit, to a sever 200, the manipulation information and the feeling information of the second user with respect to the first application. Also, the external device 300 may transmit the manipulation information and the feeling information of the plurality of users, such as the third to fifth users, with respect to the first application, to the server 200.

In operation S1860, the server 200 may generate analysis data with respect to the first application based on the manipulation information and the feeling information of the second user received from the external device 300. The analysis data with respect to the first application may include information about a function, content, and structure of the first application preferred by the second user, but is not limited thereto.

According to an embodiment, the server 200 may generate a data set with respect to the first application by receiving the manipulation information and the feeling information of the plurality of users with respect to the first application. For example, the server 200 may classify data based on each function, content, structure, and user interface of the first application, or may classify the data set based on collected feelings.

For example, the server 200 may extract data with respect to the first function provided by the first application, analyze the feeling information of the plurality of users with respect to the first function, and obtain the feeling information of a majority of users with respect to the first function. Here, the server 200 may use, as the analysis data with respect to the first function, the feeling information of the majority of users with respect to the first function.

Also, the server 200 may extract a function, content, and structure of the first application, towards which the plurality of users have a first feeling (for example, happiness), and analyze the extracted function, content, and structure to determine with respect to which function, content, and structure the plurality of users mostly have the first feeling.

In operation S1870, the server 200 may transmit the analysis data with respect to the first application to the electronic device 100.

According to an embodiment, the server 200 may transmit the analysis data to the electronic device 100 at certain cycles. Alternatively, the server 200 may transmit the analysis data to the electronic device 100 in response to a request from the electronic device 100.

According to an embodiment, the server 200 may transmit the entire analysis data to the electronic device 100, or only a part of the analysis data to the electronic device 100. For example, the server 200 may transmit, to the electronic device 100, data obtained by analyzing functions with which the second user is happy from among the functions provided by the first application.

In operation S1880, the electronic device 100 may modify a user interface of an application based on the analysis data received from the server 200, and the manipulation information and the feeling information of the first user.

For example, when data indicating that other users are happy with the third function of the first application is received, and the first user frequently manipulates the third function and also has a positive emotional state, the electronic device 100 may put the third function at a high priority. Also, the electronic device 100 may modify a user interface of the first application such that an icon for executing the third function is displayed in a main page.

Also, when the electronic device 100 receives data indicating that other users are happy with a structure related to a particular path for executing the fourth function of the first application, but the first user has a negative feeling, the electronic device 100 may not allow a change from a structure related to a current path for executing the fourth function to the structure related to the particular path with which the other users are happy.

In operation S1890, the electronic device 100 may provide the application including the modified user interface. Since operation S1890 corresponds to operation S240 of FIG. 2, details thereof are not provided again.

Figure 19:
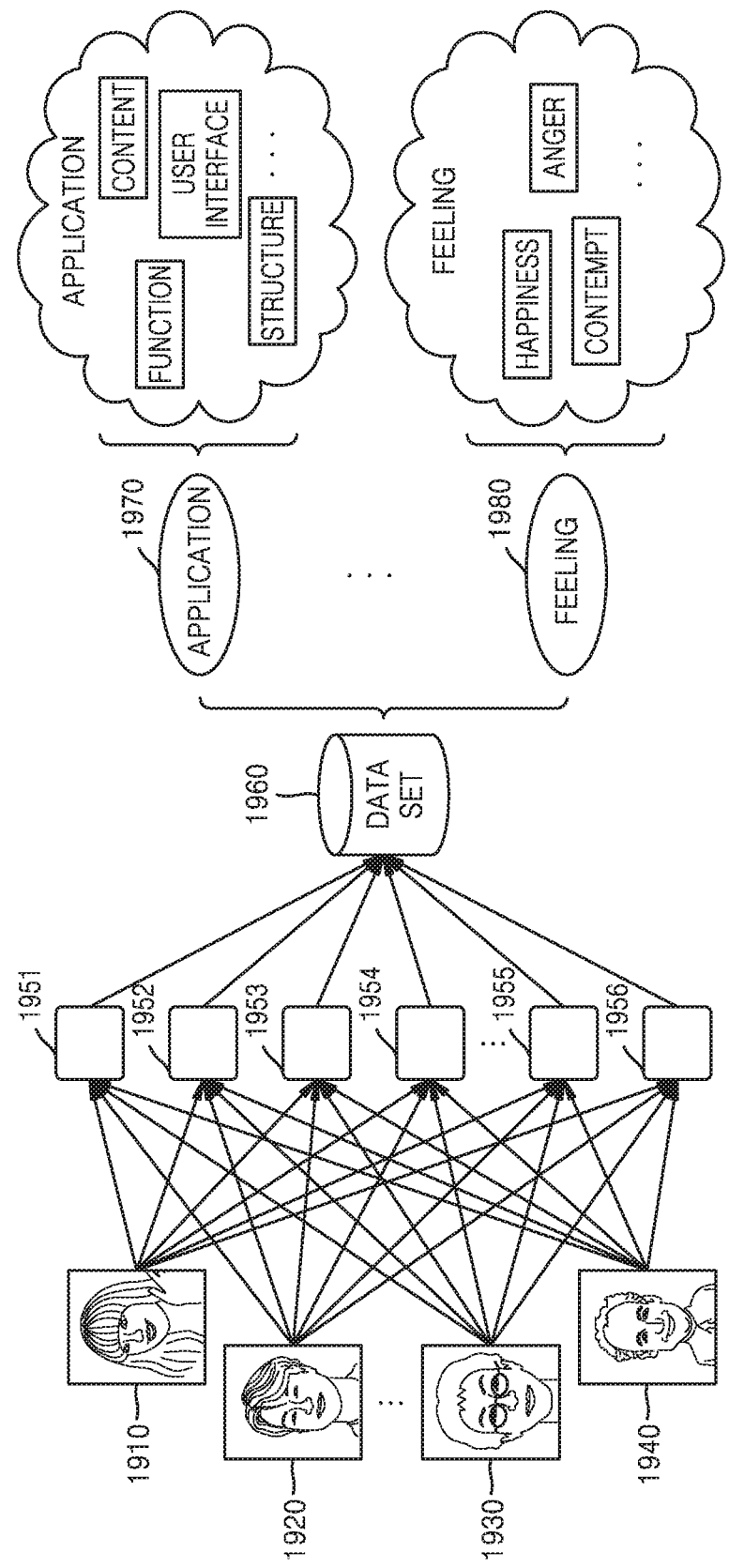
FIG. 19 is a diagram for describing data collection of a server, according to an embodiment.

FIG. 19 is a diagram for describing data collection of a server, according to an embodiment.

In FIG. 19, details overlapping those of FIG. 18 are not provided again.

According to an embodiment, an electronic device of a first user 1910 may obtain manipulation information and feeling information of the first user with respect to a plurality of applications 1951 to 1956 including a first application 1951 to a sixth application 1956.

Similarly, electronic devices of a plurality of users including a second user 1920, a third user 1930, and a fourth user 1940, may obtain manipulation information and feeling information of each user with respect to each of the plurality of applications 1951 to 1956.

According to an embodiment, the plurality of electronic devices may transmit, to the server 200, the manipulation information and the feeling information of the plurality of users 1910 to 1940 with respect to each application, and the server 200 may generate a data set 1960.

According to an embodiment, the server 200 may classify the data set 1960 into categories, such as an application 1970, a feeling 1980, etc. The categories of the application 1970 may include a function, structure, contents, and user interface of each of the plurality of applications 1951 to 1956. The categories of the feeling 1980 may include emotional states, such as happiness, anger, contempt, etc.

According to an embodiment, the server 200 may extract data related to a second structure provided by a third application and analyze feeling information of the plurality of users with respect to the second structure provided by the third application.

According to an embodiment, the server 200 may extract a function, content, structure, and user interface towards which the plurality of users have a first feeling, and analyze with respect to which application, function, content, structure, or user interface the users mainly have the first feeling. For example, the server 200 may generate analysis data indicating that more than 92% of 2043 users have an angry feeling with respect to a first application and a third function of a third application.

Figure 20:
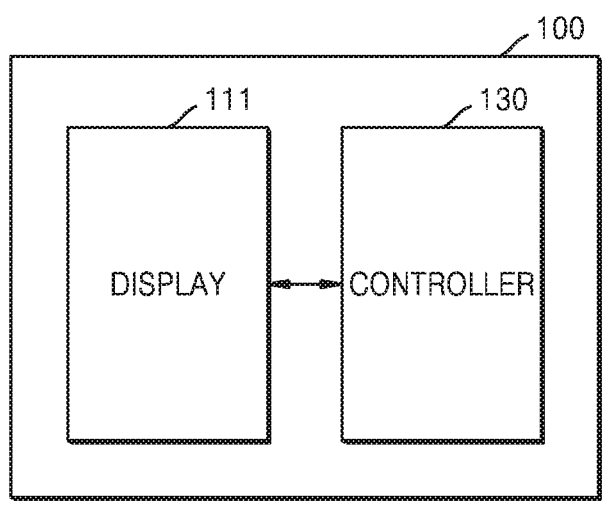
FIGS. 20 and 21 are block diagrams for describing a structure of an electronic device, according to embodiments.
Figure 21:
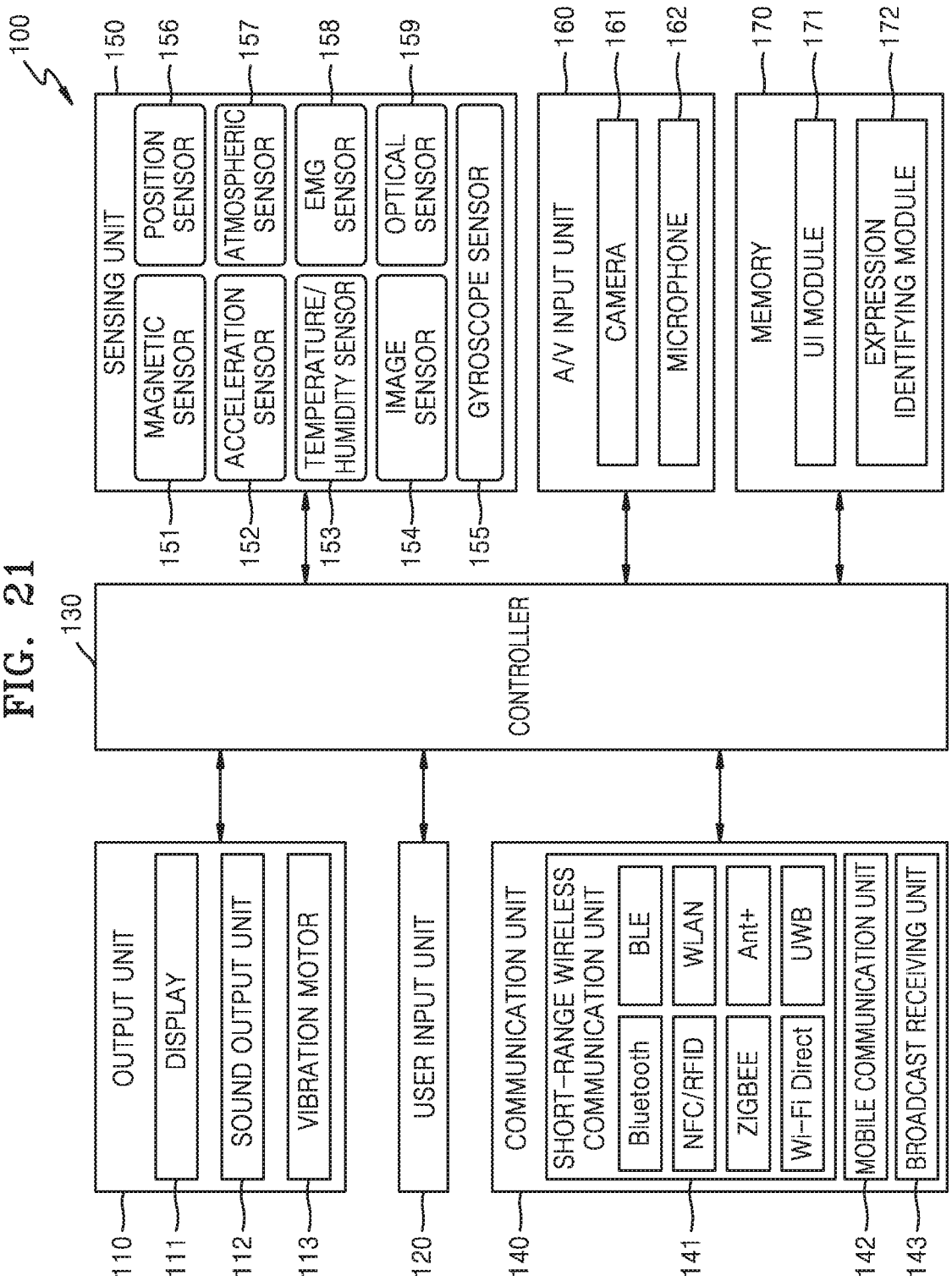

FIGS. 20 and 21 are block diagrams for describing a structure of an electronic device, according to embodiments.

As shown in FIG. 20, the electronic device 100 according to an embodiment may include a display 111 and a controller 130. However, the components shown in FIG. 20 are not all essential components of the electronic device 100. The electronic device 100 may include more than those shown in FIG. 20, or may include less than those shown in FIG. 20.

For example, as shown in FIG. 21, the electronic device 100 according to an embodiment may further include an output unit 110, a user input unit 120, a communication unit 140, a sensing unit 150, an audio/video (A/V) input unit 160, and a memory 170 in addition to the display 111 and the controller 130.

The output unit 110 may output an audio signal, a video signal, or a vibration signal. For example, the output unit 110 may include the display 111, a sound output unit 112, and a vibration motor 113.

The display 111 displays and outputs information processed by the electronic device 100. For example, the display 111 may display a user interface of an application.

Meanwhile, when the display 111 is configured as a touch screen by forming a layer structure with a touch pad, the display 111 may also be used as an input device as well as an output device. The display 111 may include at least one of a liquid crystal display (LCD), a thin-film-transistor liquid-crystal display (TFT-LCD), an organic light-emitting diode (OLED), a flexible display, a 3D display, and an electrophoretic display. Also, according to an embodiment of the electronic device 100, the electronic device 100 may include at least two displays 111. Here, the at least two displays 111 may be disposed to face each other by using a hinge.

The display 111 may provide the application including the user interface modified based on manipulation information of a user and feeling information of the user.

The sound output unit 112 outputs audio data received from the communication unit 140 or stored in the memory 170. Also, the sound output unit 112 outputs a sound signal related to a function (for example, a call signal reception sound, a message reception sound, or an alarm sound) performed by the electronic device 100. The sound output unit 112 may include a speaker or a buzzer.

The vibration motor 113 may output a vibration signal. For example, the vibration motor 113 may output a vibration signal corresponding to an output of audio data or video data (for example, a call signal reception sound or a message reception sound). Also, the vibration motor 1230 may output a vibration signal when a touch screen is touched.

The user input unit 120 is a unit for the user to input data for controlling the electronic device 100. Examples of the user input unit 120 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The controller 130 controls overall operations of the electronic device 100. For example, the controller 130 may generally control the output unit 110, the user input unit 120, the communication unit 140, the sensing unit 150, and the A/V input unit 160 by executing programs stored in the memory 170.

The controller 130 may obtain the manipulation information of the user with respect to the application. For example, the controller 130 may obtain, as the manipulation information, at least one of a manipulation location, a manipulation force, and a manipulation frequency of the user manipulating the application.

The controller 130 may obtain the feeling information of the user related to manipulation of the application. For example, the controller 130 may identify an expression of the user manipulating the application, and determine an emotional state of the user based on the identified expression of the user. For example, the controller 130 may extract feature points from a face image of the user manipulating the application, which is obtained through an image sensor 154, and identify the expression of the user based on a result of comparing the extracted feature points and feature points included in pre-defined expression information.

According to an embodiment, the controller 130 may control the sensing unit 150 to detect at least one of a sweat amount, muscle contraction information, finger tremor information, heart rate information, and pulse information of the user manipulating the application, and determine the emotional state of the user based on the detected at least one information.

According to an embodiment, the controller 130 may modify the user interface of the application based on the manipulation information and the feeling information of the user. For example, the controller 130 may analyze the manipulation information and the feeling information of the user to determine priorities between functions provided by the application. The controller 130 may modify the user interface based on the determined priorities between the functions.

Also, the controller 130 may determine priorities between pieces of content displayed in the application based on the manipulation information and the feeling information of the user, and change an arrangement of the pieces of content according to the determined priorities of the pieces of content.

The controller 130 may obtain information about a path for executing the first function, and determine preference of the user with respect to the path for executing the first function. The controller 130 may selectively change a structure related to the path for executing the first function based on the preference of the user.

According to an embodiment, the controller 130 may recommend another application to the user based on the manipulation information and the feeling information of the user.

The communication unit 140 may include at least one component enabling the electronic device 100 to communicate with the external device 300 or the server 200. For example, the communication unit 140 may include a short-range wireless communication unit 141, a mobile communication unit 142, and a broadcast receiving unit 143.

The short-range communication unit 141 may include a Bluetooth communication unit, a Bluetooth low energy (BLE) communication unit, a near-field communication (NFC) unit, a wireless local area network (WLAN) (Wi-Fi) communication unit, a Zigbee communication unit, an infrared data association (IrDA) communication unit, a Wi-Fi direct (WFD) communication unit, an ultra-wideband (UWB) communication unit, and an Ant+ communication unit, but is not limited thereto.

The mobile communication unit 142 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiving unit 143 receives a broadcast signal and/or broadcast related information from an external source, through a broadcast channel. The broadcast channel may include a satellite channel or a terrestrial broadcasting channel.

According to an embodiment, the electronic device 100 may not include the broadcast receiving unit 143.

Also, the communication unit 140 may exchange information required to modify the user interface with the server 200 and the external device 300.

The sensing unit 150 may detect a state of the electronic device 100 or a state around the electronic device 100, and transmit the detected state to the controller 130.

The sensing unit 150 may include at least one of a magnetic sensor 151, an acceleration sensor 152, a temperature/humidity sensor 153, the image sensor 154, a gyroscope sensor 155, a position sensor 156 (for example, a global positioning system (GPS)), an atmospheric sensor 157, an EMG sensor 158, an optical sensor 159, an infrared sensor (not shown), a proximity sensor (not shown), and a red, green, blue (RGB) sensor (illuminance sensor) (not shown), but is not limited thereto. Because functions of each sensor may be intuitively inferred by one of ordinary skill in the art based on its name, details thereof are not described herein.

The A/V input unit 160 receives an audio signal or a video signal, and may include the camera 161 and a microphone 162. The camera 161 may obtain an image frame of a still image or a moving image via the image sensor in a video telephone mode or a photographing mode. An image captured via the image sensor may be processed by the controller 130 or a separate image processor (not shown).

An image frame processed by the camera 161 may be stored in the memory 170 or externally transmitted through the communication unit 140. According to an embodiment of a terminal, there may be at least two cameras 161.

The microphone 1620 receives an external sound signal and processes the external sound signal to electric voice data. For example, the microphone 162 may receive a sound signal from an external device or a narrator. The microphone 162 may use any one of various noise removing algorithms to remove noise generated while receiving the external sound signal.

The memory 170 may store programs for processes and controls of the controller 130, and may store data input to or output from the electronic device 100.

The memory 170 may include at least one type of storage medium from among a flash memory, a hard disk, a multimedia card micro-type memory, a card-type memory (for example, a secure digital (SD) card or an extreme digital (XD) card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 170 may be classified into a plurality of modules based on functions, and for example, may be classified into a user interface (UI) module 171 and an expression identifying module 172.

The UI module 171 may provide a specialized UI or GUI linked to the device 100 according to applications.

The expression identifying module 172 may extract the feature points from the face image of the user manipulating the application, compare the extracted feature points and feature points included in pre-defined expression information, and identify the expression of the user based on a result of the comparing.

According to an embodiment, the electronic device 100 may increase satisfaction of the user with respect to application manipulation by adaptively changing the user interface of the application based on a feeling of the user.

According to an embodiment, the electronic device 100 may improve UX with respect to the application by obtaining the manipulation information and the feeling information of the user without a separate user input, and modifying the user interface by reflecting the obtained information.

The application providing method according to an embodiment of the present disclosure may be recorded on a non-transitory computer-readable recording medium by being realized in computer programs executed by using various computers. The non-transitory computer-readable recording medium may include at least one of a program command, a data file, and a data structure. The program commands recorded in the non-transitory computer-readable recording medium may be specially designed or well known to one of ordinary skill in the computer software field. Examples of the non-transitory computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter.

It should be understood that embodiments described herein should be considered in a descriptive sense only and not for purposes of limitation. Descriptions of features or aspects within each embodiment should typically be considered as available for other similar features or aspects in other embodiments.

The invention claimed is:

1. An application providing method of an electronic device, the application providing method comprising:
    obtaining manipulation information of a user with respect to an application provided by the electronic device, wherein the manipulation information comprises at least one of information with regard to a function selected by the user from among functions provided by the application, information with regard to a manipulation location of a point where a touch is detected on the electronic device, information with regard to a manipulation force of touching the electronic device, or information with regard to a manipulation frequency of using the application;
    obtaining feeling information of the user with respect to manipulation of the application corresponding to the manipulation information of the user;
    modifying a user interface of the application based on the manipulation information and the feeling information of the user; and
    providing the application comprising the modified user interface;
    wherein the modifying of the user interface of the application comprises:
    determining priorities between functions provided by the application by analyzing the manipulation information and the feeling information of the user; and
    modifying the user interface based on the determined priorities between the functions.

2. The application providing method of claim 1, wherein the obtaining of the feeling information comprises:
    identifying an expression of the user manipulating the application; and
    determining an emotional state of the user based on the expression of the user.

3. The application providing method of claim 2, wherein the identifying of the expression of the user comprises:
    obtaining a face image of the user manipulating the application, through an image sensor;
    extracting feature points from the face image of the user;
    comparing the extracted feature points and feature points included in pre-defined expression information; and identifying the expression of the user based on a result of the comparing.

4. The application providing method of claim 1, wherein the obtaining of the feeling information comprises:
detecting at least one of sweating amount information, muscle contraction information, finger tremor information, heart rate information, and pulse information of the user manipulating the application; and
determining an emotional state of the user based on the at least one detected information.

5. The application providing method of claim 1, wherein the modifying of the user interface of the application comprises:
determining priorities between pieces of content displayed in the application, based on the manipulation information and the feeling information of the user; and
changing an arrangement of the pieces of content based on the determined priorities between the pieces of content.

6. The application providing method of claim 1, wherein the modifying of the user interface of the application comprises:
obtaining information about a execution path of a first function;
determining a preference of the user with respect to the execution path of the first function; and
selectively changing a structure related to the execution path of the first function, based on the determined preference of the user.

7. The application providing method of claim 1, further comprising recommending another application to the user based on the manipulation information and the feeling information of the user.

8. The application providing method of claim 1, wherein the modifying of the user interface of the application comprises:
obtaining manipulation information and feeling information of another user with respect to the application, from an external device; and
modifying the user interface of the application while considering the manipulation information and the feeling information of the other user.

9. An electronic device comprising:
a display; and
a controller configured to:
obtain manipulation information of a user with respect to an application, wherein the manipulation information comprises at least one of information with regard to a function selected by the user from among functions provided by the application, information with regard to a manipulation location of a point where a touch is detected on the electronic device, information with regard to a manipulation force of touching the electronic device, or information with regard to a manipulation frequency of using the application,
obtain feeling information of the user with respect to manipulation of the application corresponding to the manipulation information of the user,
modify a user interface of the application based on the manipulation information and the feeling information of the user; and
control the display to display the application comprising the modified user interface; and
determine priorities between functions provided by the application by analyzing the manipulation information and the feeling information of the user, and modify the user interface based on the determined priorities between the functions.

10. The electronic device of claim 9, wherein the controller is further configured to determine priorities between pieces of content displayed in the application based on the manipulation information and feeling information of the user, and change an arrangement of the pieces of content according to the determined priorities between the pieces of content.

11. The electronic device of claim 9, wherein the controller is further configured to obtain information about a execution path of a first function, determine a preference of the user with respect to the execution path of the first function, and selectively change a structure related to the execution path of the first function based on the determined preference of the user.

12. A computer program product comprising a non-transitory computer readable storage medium having a computer readable program stored therein,
wherein the computer readable program, when executed on a computing device, causes the computing device to:
obtain manipulation information of a user with respect to an application provided by an electronic device, the manipulation information comprising at least one of information with regard to a function selected by the user from among functions provided by the application, information with regard to a manipulation location of a point where a touch is detected on the electronic device, information with regard to a manipulation force of touching the electronic device, or information with regard to a manipulation frequency of using the application,
obtain feeling information of the user with respect to manipulation of the application corresponding to the manipulation information of the user,
modify a user interface of the application based on the manipulation information and the feeling information of the user,
control a display of the electronic device to display the application comprising the modified user interface, and
determine priorities between functions provided by the application by analyzing the manipulation information and the feeling information of the user, and modify the user interface based on the determined priorities between the functions.

* * * * *